(12) United States Patent
Zeng et al.

(10) Patent No.: US 8,797,936 B2
(45) Date of Patent: Aug. 5, 2014

(54) COOPERATIVE COMMUNICATION METHODS AND DEVICES

(75) Inventors: Yonghong Zeng, Singapore (SG); Sumei Sun, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 298 days.

(21) Appl. No.: 13/129,220

(22) PCT Filed: Nov. 3, 2009

(86) PCT No.: PCT/SG2009/000403
§ 371 (c)(1),
(2), (4) Date: Jun. 29, 2011

(87) PCT Pub. No.: WO2010/056203
PCT Pub. Date: May 20, 2010

(65) Prior Publication Data
US 2011/0299519 A1    Dec. 8, 2011

Related U.S. Application Data

(60) Provisional application No. 61/114,622, filed on Nov. 14, 2008.

(51) Int. Cl.
*H04J 3/00* (2006.01)
*H04B 7/02* (2006.01)
*H04L 1/06* (2006.01)
H04L 25/02 (2006.01)
H04L 1/00 (2006.01)
H04L 27/26 (2006.01)
H04B 7/155 (2006.01)

(52) U.S. Cl.
CPC ............ *H04B 7/026* (2013.01); *H04L 25/0224* (2013.01); *H04L 2001/0097* (2013.01); *H04L 1/0618* (2013.01); *H04L 27/2601* (2013.01); *H04B 7/15592* (2013.01)
USPC ........................................................ 370/312

(58) Field of Classification Search
USPC .......................................................... 370/312
See application file for complete search history.

(56) References Cited

U.S. PATENT DOCUMENTS

2004/0114618 A1* 6/2004 Tong et al. .................... 370/431
2007/0076649 A1   4/2007 Lin et al.

FOREIGN PATENT DOCUMENTS

WO         2006/121381 A1    11/2006
WO    WO 2006121381 A1 *    11/2006

OTHER PUBLICATIONS

International Search Report, PCT/SG2009/000403, dated Jan. 20, 2010.

(Continued)

*Primary Examiner* — Huy D Vu
*Assistant Examiner* — Teisha D Hall
(74) *Attorney, Agent, or Firm* — Lerner, David, Littenberg, Krumholz & Mentlik, LLP

(57) ABSTRACT

Cooperative communication methods for a wireless communication network (100) and devices configured to perform such methods are disclosed herein. In a described embodiment, the network (100) includes a first communication device (102) and a second communication device (104), each of the communication devices (102,104) being associated with respective users and configured to communicate with a common base station (130). The cooperative communication method comprises the first communication device (102) transmitting a first message to the second communication device (104) for transmission to the base station (130) as a first routed message; and receiving a second message from the second communication device (104) for transmission to the base station (130) as a second routed message. In this way, the transmission is able to achieve diversity gains at the base station (130).

35 Claims, 10 Drawing Sheets

(56) References Cited

OTHER PUBLICATIONS

J. Nicholas Laneman, "Corporative Diversity in Wireless Networks: Algorithms and Architectures", Massachusetts Institute of Technologh, Sep. 2002, retrieved from internet, URL<http://citeseerx.ist.psu.edu/viewdoc/download?doi=10.1.1.129.305&rep=rep1&type=pdf>.

D. Soldani and S. Dixit, "Wireless relays for broadband access," IEEE Communications Magazine, pp. 58-66, Mar. 2008.

Y. Jing and H. Jafarkhani, "Using orthogonal and quasi-orthogonal designs in wireless relay networks," IEEE Trans. Inform. Theory, vol. 53, pp. 4106-4118, Nov. 2007.

Y. Jing and B. Hassibi, "Distributed space-time coding in wireless relay networks," IEEE Trans. Wireless Comm., vol. 5, pp. 3524-3536, Dec. 2006.

Z. Li and X.-G. Xia, "A simple Alamouti space-time transmission scheme for asynchronous cooperative systems," IEEE Signal Processing Lett., vol. 14, pp. 804-807, Nov. 2007.

Popovski, P. and Yomo, H., "Physical network coding in two-way wireless relay channels," in IEEE International Conference on Communications, pp. 707-712, 2007.

S. Katti, H. Rahul, W. Hu, D. Katabi, M. Medard, and J. Crowcroft, "XORs in the air: Practical wireless network coding," in Proc. Conf. on Applications, Technologies, Architectures, and Protocols for Computer Communications, 2006.

Chinese Office Action for Application No. 20090145731.2 dated May 2, 2013.

\* cited by examiner

SER for BPSK modulation ($\gamma = 10\,\text{dB}$)

SER for 4 QAM modulation ($\gamma = 10\,\text{dB}$)

SER for BPSK modulation ($\gamma = 20\,\text{dB}$)

SER for 4 QAM modulation ($\gamma = 20\,\text{dB}$)

SER for 16 QAM modulation ($\gamma = 20\,\text{dB}$)

SER for 4 QAM modulation ($\gamma = 20\,\text{dB}$, NMSE=-20dB)

SER for 4 QAM modulation ($\gamma = 20\,dB$, NMSE=-30dB)

SER for 4 QAM modulation ($\gamma = 20\,dB$, NMSE=-40dB)

COOPERATIVE COMMUNICATION METHODS AND DEVICES

CROSS REFERENCE TO RELATED APPLICATIONS

The present application is a national phase entry under 35 U.S.C. §371 of International Application No. PCT/SG2009/000403, filed Nov. 3, 2009, published in English, which claims the benefit of U.S. Patent Application No. 61/114,622, filed Nov. 14, 2008. The disclosures of said applications are incorporated by reference herein.

FIELD AND BACKGROUND OF THE INVENTION

The present invention relates to cooperative communication methods, particularly but not exclusively between a group of users and a base station. The present invention also relates to devices configured to perform the methods.

In a typical wireless communication network, there is a plurality of mobile communication devices configured to communicate with a common destination, such as a base station. If the mobile communication devices have a single antenna, an option for multiple access is to make use of time division multiple access (TDMA) where each mobile communication device transmits data on a different time slot to the base station. A disadvantage of such a scheme is that the received signal at the destination might be deeply faded and no diversity is available to reliably recover the transmitted signals.

There have been proposed schemes to achieve diversity but such schemes assume flat fading channel which is in reality not the case.

It is an object of the present invention to provide a cooperative communication method and device which address at least one of the problems of the prior art and/or to provide the public with a useful choice.

SUMMARY OF THE INVENTION

In general terms, the invention proposes using users or communication devices to cooperate with each other such that a transmitted signal can be reliably recovered at a destination.

In a first specific expression of the invention, there is provided a space-time coded cooperative communication method for a wireless communication network, the network including a first communication device and a second communication device, each of the communication devices being associated with respective users and configured to communicate with a common destination, the method comprising the steps of:

the first communication device, transmitting a first message to the second communication device for transmission to the common destination as a first routed message; and receiving a second message from the second communication device for transmission to the common destination as a second routed message.

In this specification, the terms "user" and "communication device" are used interchangeably to refer to a communication device associated with a user. This communication device may for example be the mobile equipment for a cellular system.

If full duplex is available, the transmission of the first message to the second communication device and receiving the second message from the second communication device are carried out in the same time slot. As an alternative, in half duplex, the transmission of the first message to the second communication device and receiving the second message from the second communication device may be carried out in different time slots.

Preferably, the method may further comprise the steps of: discarding a first padding from the received second message; performing a complex conjugate on the received second message; re-ordering of the received second message; and inserting a second padding into the received second message, to form the second routed message for transmission to the common destination. The discarding, performing a complex conjugate, re-ordering and inserting steps may be performed in a time slot different from the time slot for transmitting the first message.

The first padding and/or the second padding may include a cyclic prefix.

The method may further comprise the step of decoding the second message after discarding the first padding from the second message. The method may also comprise the step of amplifying the second message. In this way, the second message may be amplified using an amplification factor.

Preferably, the method may further comprise the step of: negating the second message and/or converting the second message from frequency domain to time domain. This may be by way of an IDFT operation.

Advantageously, the second routed message is transmitted using OFDM modulation. As an alternative, the second routed message may be transmitted using Single Carrier—Cyclic Prefix modulation.

The method may further comprise the step of; the second communication device, receiving the first message for transmission to the destination. The method may then further comprise the steps of: the second communication device, discarding a first padding from the received first message; performing a complex conjugate on the received first message; re-ordering of the received first message; and inserting a second padding into the received first message, to form the first routed message for transmission to the common destination. The discarding, performing a complex conjugate, re-ordering and inserting steps may be performed in a time slot different from the time slot for receiving the first message.

Preferably, the method further comprises the steps of: the common destination, receiving the first message directly from the first communication device, receiving the second message directly from the second communication device; and decoding the received first and second messages and the first and second routed messages.

As a first combining scheme, the decoding may comprise the steps of: converting the received first and second messages from time to frequency domain; and obtaining a first combination sequence by linearly combining the frequency domain first and second messages. The method may further comprise obtaining a second combination sequence by linearly combining the first combination sequence and the first and second routed messages.

As second and third combining schemes, it is possible that the decoding may further comprise the steps of: converting the first and second routed messages from time to frequency domain; and wherein the first combination sequence includes linearly combining the frequency domains of the first and second messages, and the first and second routed messages.

As a form of full duplex operation, the decoding may comprise the steps of: converting the received first message and the first and second routed message from time to frequency domain; and obtaining a first combination sequence by linearly combining the frequency domain first message and the first and second routed messages.

The first, second and third combining schemes may further comprise dividing the first combination sequence or the second combination sequence by a constraint sequence which characterizes a first transmission path between the first communication device and the common destination, and a second transmission path between the second communication device and the destination.

The constraint sequence may be obtained by combining a first channel parameter which characterizes the first transmission path and a second channel parameter which characterizes the second transmission path.

The method may also comprise the steps of, prior to the decoding step, the common destination, discards a first padding from the received first message; discards a second padding from the first routed message.

It is envisaged that the method may further comprise the step of: the first communication device transmitting the second routed message to a third communication device of the network, and the third communication device relaying the second routed message to the destination. It is also envisaged that the method may further comprise the step of: the second communication device transmitting the first routed message to a fourth communication device of the network, and the fourth communication device relaying the first routed message to the destination.

Training schemes may be used to obtain certain parameters for the above mentioned methods. In exemplary training schemes to obtain certain parameters, the method may further comprise, prior to decoding the received first and second messages, the common destination estimating the first channel parameter based on a main training signal transmitted by the first communication device.

A training signal may also be used to estimate a parameter at the communication device. For example, the method may further comprise the steps of, prior to transmitting the first message, the first communication device transmits an auxiliary training signal to the second communication device, and obtains an inter-device channel parameter which characterizes an inter-device transmission path between the first and the second communication device based on the training signal; and transmits the inter-device channel parameter to the common destination.

The auxiliary training signal transmitted from the communication device to the second communication device may optionally comprise a first training signal and a repetition of the first training signal.

The auxiliary training signal used to perform estimation at the communication device may also be the same as the main training signal used to perform estimation at the common destination. In such a case, the auxiliary training signal is the main training signal.

Amplification factors used for amplifying signals may also be estimated at the common destination for decoding the amplified signals. Thus, the method may further comprise the second communication device retransmitting the auxiliary signal to the common destination which estimates an amplification factor based on the auxiliary signal for decoding the amplified second message.

Transmitting the inter-device channel parameter may comprise transmitting a complex conjugate of the inter-device channel parameter. Further, the transmission may also comprise transmitting a negation of the complex conjugate of the inter-device channel parameter.

The second routed message may comprise in a first signal interval, a first routed training signal; and in a second signal interval, a second routed training signal, the second routed training signal being a negation of the first routed training signal. In this way, training sequences may be relayed in different time intervals.

In a second specific expression of the invention, there is provided a space-time coded cooperative communication method for a wireless communication network, the network including a first communication device and a second communication device, each of the communication devices being associated with respective users and configured to communicate with a common destination, the method comprising the steps of:

the common destination, receiving a first routed message from the second communication device, the first routed message including a first message transmitted by the first communication device;

receiving a second routed message from the first communication device, the second routed message including a second message transmitted by the second communication device; and receiving the first and second messages directly from the first and second communication devices respectively.

The wireless communication network may be a cellular network. The communication devices may be mobile communication devices. In this respect, this actually forms a third specific expression of the invention in which there is provided a communication device configured for space-time coded cooperative communication with a second communication device in a wireless communication network, the communication device and the second communication device being associated with respective users and configured to communicate with a common destination, the communication device further configured to transmit a first message to the second communication device for transmission to the common destination; and to receive a second message from the second communication device for transmission to the common destination.

If full duplex is available, the communication device may be configured to transmit the first message to the second communication device and receive the second message from the second communication device in the same time slot.

The communication device may be configured in half duplex and the communication device may be configured to transmit the first message to the second communication device and receive the second message from the second communication device in different time slots.

The methods discussed earlier may be performed by an integrated circuit and this forms a fourth specific expression of the invention in which there is provided an integrated circuit (IC) for a communication device which is configured for space-time coded cooperative communication with a second communication device in a wireless communication network, the communication device and the second communication device being associated with respective users and configured to communicate with a common destination, the IC comprising: a processing unit configured to transmit a first message to the second communication device for transmission to the common destination; and to receive a second message from the second communication device for transmission to the common destination.

A fifth specific expression of the invention is also envisaged in which there is provided an Integrated circuit (IC) for a base station of a wireless communication network including first and second communication devices configured for space-time coded cooperative communication, each communication device being associated with respective users and configured to communicate with the base station, the IC including
   a processor configured to:
      receive a first routed message from the second communication device, the first routed message including a first message transmitted by the first communication device;
      receive a second routed message from the first communication device, the second routed message including a second message transmitted by the second communication device; and
      receive the first and second messages directly from the first and second communication devices respectively.

The IC of the fifth expression may be configured to perform a first combining scheme and the IC may be further configured to: convert the received first and second messages from time to frequency domain; and obtain a first combination sequence by linearly combining the frequency domain first and second messages. The IC may also be further configured to obtain a second combination sequence by linearly combining the first combination sequence and the first and second routed messages.

The IC may be configured to perform other combining schemes in which the IC may be configured to convert the first and second routed messages from time to frequency domain; and wherein the first combination sequence includes linearly combining the frequency domains of the first and second messages, and the first and second routed messages.

The processing unit may be further configured to convert the received first message and the first and second routed message from time to frequency domain; and obtain a first combination sequence by linearly combining the frequency domain first message and the first and second routed messages.

The IC may be further configured to divide the first combination sequence or the second combination sequence by a constraint sequence which characterizes a first transmission path between the first communication device and the common destination, and a second transmission path between the second communication device and the destination.

The constraint sequence may be obtained by combining a first channel parameter which characterizes the first transmission path and a second channel parameter which characterizes the second transmission path.

The IC of the fifth expression may be used in a base station or other destination or relay equipment which is configured to for such applications. Also, the base station and the communication device or devices may be used in a wireless communication network.

As described in the preferred embodiment, the proposed communication may provide the advantage of providing for space and time diversity in the communication uplink, and may optionally allow the implementation of a space-time coding scheme. The signal reliability at the destination or base station may also be increased.

It should be apparent that features described for a specific aspect/expression are also applicable for the other aspects/expressions.

It can be appreciated from the described embodiment(s) that the method and apparatuses may additionally also have the advantages of:
   eliminating multi-user interference (MUI).
   eliminating inter-symbol interferences (ISI).
   requiring only one antenna at each communication device.
   achieving space-time coding using only one antenna.
   being immune to frequency selective fading.
   requiring only simple, low complexity processing at each communication device.
   using low-complexity combination schemes at the destination.
   operational under half-duplex conditions.
   not having to compensate for additive noise.

The described embodiments also have the advantage that during cooperative transmission, time slots can be pipelined. This would permit multiple orthogonal frequency-division multiplexing (OFDM), single carrier cyclic prefix (SCCP) or single carrier with zero padding (SCZP) blocks to be transmitted.

BRIEF DESCRIPTION OF THE DRAWINGS

One or more embodiments will be described, by way of example only, with reference to the accompanying drawings, in which:

FIG. 3($b$) is a flow chart illustrating a variation of the channel estimation scheme of FIG. 3($a$);

FIG. 4($b$) are time block diagrams illustrating communication in different time slots based half duplex on SCCP or SCZP between two users and the base station of FIG. 1;

FIG. 5($b$) are time block diagrams illustrating communication in different time slots based on full duplex OFDM between two users and the base station of FIG. 1;

FIG. 7($b$) is a graph of an average SER of a signal recovered at the base station based on the signal combining scheme of FIG. 6 when 4 QAM modulation is used and $\gamma$ is 10 dB;

FIG. 7($c$) is a graph of an average SER of a signal recovered at the base station based on the signal combining scheme of FIG. 6 when BPSK modulation is used and $\gamma$ is 20 dB;

FIG. 7($d$) is a graph of an average SER of a signal recovered at the base station based on the signal combining scheme of FIG. 6 when 4 QAM modulation is used and $\gamma$ is 20 dB;

FIG. 7($e$) is a graph of an average SER of a signal recovered at the base station based on the signal combining scheme of FIG. 6 when 16 QAM modulation is used and $\gamma$ is 20 dB;

FIG. 7($f$) is a graph of an average SER of a signal recovered at the base station based on the signal combining scheme of FIG. 6 when 4 QAM modulation is used, $\gamma$ is 20 dB and channel estimation normalized mean square error (NMSE) is −20 dB;

FIG. 7($g$) is a graph of an average SER of a signal recovered at the base station based on the signal combining scheme of FIG. 6 when 4 QAM modulation is used, γ is 20 dB and channel estimation NMSE is −30 dB.

DETAILED DESCRIPTION OF THE PREFERRED EMBODIMENTS

Figure 1:
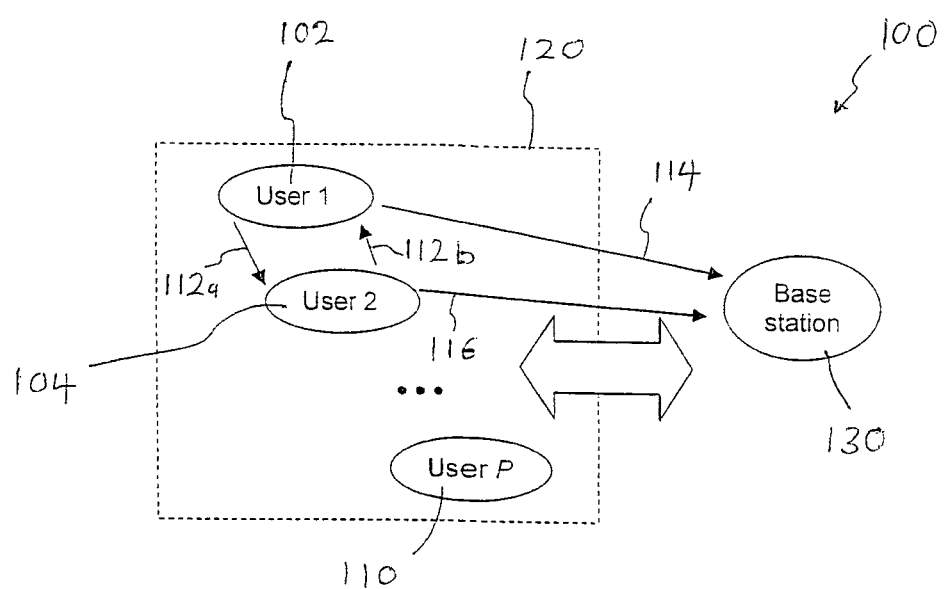
FIG. 1 is a schematic drawing of a wireless communication network comprising a group of users and a base station according to an example embodiment.

A wireless communication network 100 is shown in FIG. 1 and in this embodiment, the network is a cellular network. The network 100 comprises a group 120 of P users 102, 104 . . . 110 where P is any number of users, and a base station 130. In this embodiment, all the users 102, 104 . . . 110 are in the same group 120, share a same frequency band and each user has a single antenna for transmission or reception. As a result, TDMA is used for multiple access of the base station 130 by the users 102, 140 . . . 110. However, such a multiple access scheme is not ideal as it does not achieve diversity and signal reliability is poor.

Each user 102, 104 . . . 110 is a mobile communications device associated with a user and examples of a mobile communication device may include a mobile phone, notebook computer, GPS (Global Positioning Systems) etc operating within the network 100.

To achieve diversity, it is proposed that the users cooperate to increase their signal reliability when communicating with the base station 130, and more specifically, cooperative space-time coding is used. For the ease of disclosure, the present embodiment will be described using a value of P=2 i.e. based on User 1 (102) and User 2 (104) although the skilled addressee will appreciate that the present invention may be extended to P>2.

The users 102,104 may use OFDM, single carrier cyclic prefix (SCCP) or single carrier with zero padding (SCZP) as the modulation technique. The use of OFDM, SCCP or SCZP eliminates inter-symbol interference (ISI) and thus creates a more robust architecture against frequency selective fading.

Figure 2:
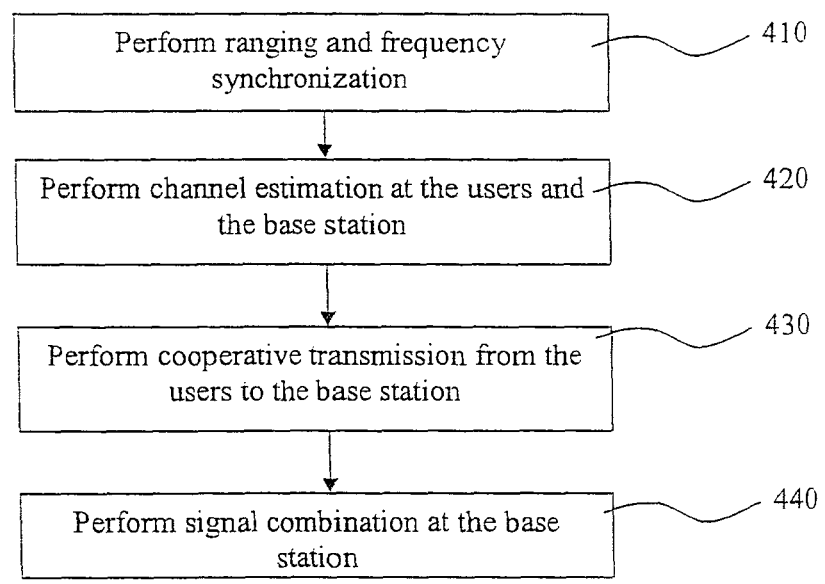
FIG. 2 is a flow chart depicting the steps of implementing cooperative space-time coding in the wireless communication network of FIG. 1.

FIG. 2 is a flow chart showing a method of implementing cooperative space-time coding between the users 102,104 and the base station 130 in the network 100.

At step 410, ranging is performed in order to align the OFDM or SCCP signals of the users 102,104. Ranging determines the distance of a user from the base station. The users 102,104 also are frequency synchronized together with the base station, resulting in the same frequency being used by the users and the base station. This will also ease the burden of subsequent frequency synchronizations.

At step 420, channel estimation is carried out. The purpose of channel estimation is to estimate channel state information of transmission channels (or inter-device channels) 112a, 112b between the users 102,104, and transmission channels 114,116 between the users 102,104 and the base station 130. Power amplifier factors α a and β which are used during cooperative transmission at step 430 are also estimated. The estimated channel state information and the power amplifier factors are then used at step 440 at the base station 130 for combining the received signals. The channel estimations can be acquired using any of Training Schemes 1 to 3 which will be discussed later.

In 430, cooperative transmission takes place either in a Half-duplex Mode or a Full-duplex Mode. During cooperative transmission, the users 102,104 cooperate to transmit data to the base station 130.

In 440, the signals received at the base station 139 are combined using the channel state information determined in 420. The signal combination can be implemented using any of Combining Schemes 1 to 4 which will be discussed later. The choice of combining scheme used is independent of the choice of training scheme; any of Combining Schemes 1 to 4 may be used with any of Training Schemes 1 to 3.

Channel Estimation (Step 420)

Three training schemes will now be described in detail for acquiring the channel estimates. It should be appreciated that the training schemes and channel estimation are not limited by the modulation technique used, and either OFDM, SCCP or SCZP modulation may be used. The training schemes use Half-duplex Mode transmission but as a skilled reader will understand, the schemes are also equally applicable for Full-duplex Mode transmissions.

The channel state information for the channel 112a from User 1 to User 2 is denoted using the parameter $g_1(l)$ and the channel state information for the channel 112b from User 2 to User 1 is denoted using the parameter $g_2(l)$. In the case where the channel between User 1 and User 2 are reciprocal, i.e. that the characteristics of the channel 112a from User 1 to User 2 is similar to the characteristics of the channel 112b from User 2 to User 1, the channel state information between User 1 and User 2 is denoted using the parameter $g(l), l=0, 1 \ldots, L$. The channel state information for the channel 114 from User 1 to the base station 130 is denoted using the parameter $h_1(l), l=0, 1 \ldots, L_1$ and the channel state information for the channel 116 from User 2 to the base station 130 is denoted using the parameter $h_2(l), l=0, 1 \ldots, L_2$.

The frequency domain channel vectors equivalent of the time domain parameters $g_1(l)$, $g_2(l)$, $g(l)$, $h_1(l)$ and $h_1(l)$ respectively are denoted $G_1(n), G_2(n), G(n), H_1(n)$ and $H_2(n)$, such that $$G(n)=[G(0), G(1), \ldots, G(N-1)]^T$$

$$G_1(n)=[G_1(0), G_1(1), \ldots, G_1(N-1)]^T$$

$$G_2(n)=[G_2(0), G_2(1), \ldots, G_2(N-1)]^T$$

$$H_1(n)=[H_1(0), H_1(1), \ldots, H_1(N-1)]^T$$

$$H_2(n)=[H_2(0), H_2(1), \ldots, H_2(N-1)]^T$$

Training Scheme 1

Figure 3A:
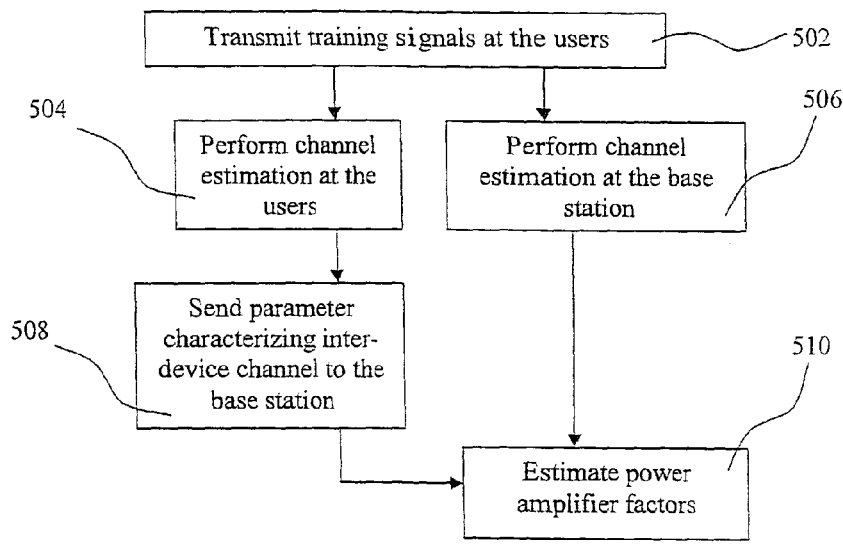
FIG. 3($a$) is a flow chart illustrating a channel estimation scheme for use in the cooperative space-time coding of FIG. 2.

FIG. 3(a) is a block diagram depicting general steps for Training Scheme 1.

In 502, the User 1 transmits a training signal (denoted $S_T$) during a first time slot and User 2 transmits the training signal $S_T$ during a second time slot. The training signal used may be similar to that which is known in the art for conventional non-cooperative OFDM, SCCP or SCZP systems.

In 504, during the first time slot, the User 2 receives the training signal transmitted by User 1. The parameter $G_1(n)$ characterizing the inter-device channel 112a from User 1 to User 2 is thus estimated. User 1 may optionally also receive the training signal transmitted by User 2 during the second time slot and estimate the channel parameter $G_2(n)$ characterizing the inter-device channel from User 2 to User 1.

An assumption is made that the channel 112a,112b between the users 102,104 is reciprocal. Thus it can be assumed that $G(n)=G_1(n)=G_2(n)$.

In 506, the base station 130 during the first time slot receives the training signal transmitted by User 1, and during the second time slot receives the training signal transmitted by User 2. The base station uses the training signals to estimate the channel parameters $H_1(n)$ and $H_2(n)$.

Alternative embodiments can in the estimation of $H_1(n)$ and $H_2(n)$ make use of training signals different from that for the estimation of $G(n)$. In such a case, User 1 and User 2 in 502 will each transmit one or more additional training signals in time slots apart from the first and the second time slots. The base station 130 in 506 will then receive the additional training signals and the estimation of $H_1(n)$ and $H_2(n)$ can be made using the additional training signals.

The estimation of the channel parameters $G_1(n)$, $G_2(n)$ and/or $G(n)$ in 504, as well as estimation of the channel parameters $H_1(n)$ and/or $H_2(n)$ in 506, may be performed using a suitable channel estimation technique that is known in the art.

In 508, the User 1 and/or User 2 transmit data packets containing the channel parameter $G(n)$ to the base station 130. In order to increase the reliability of the $G(n)$ recovered at the base station, space-time coding may be used, for example where User 1 transmits data packets in the sequence of [G G*] while User 2 transmits data packets in the sequence of [G −G*]. G denotes a data packet containing the channel parameter $G(n)$ while G* denotes a complex conjugate of G.

In 510, User 1 and User 2 reverse and perform complex conjugates on the signals received during the second time slot. Power amplification factors of β and −α are then applied at User 1 and User 2 respectively, thus resulting in $T_1=\beta G^*S_T^*$ and $T_2=-\alpha G^*S_T^*$. User 1 and User 2 respectively but simultaneously then perform retransmission in the form of $[T_1\ T_1]$ and $[T_2\ -T_2]$. $T_1$ and $T_2$ respectively denote retransmissions of the training signal received at Users 1 and 2 during the second time slot and $-T_2$ denotes the minors of $T_2$ (i.e. in other words, $-T_2$ denotes the negation of $T_2$). The transmissions take place over a third and a fourth consecutive time slots.

The training signals are received at the base station 130. In the third time slot, the signal received at the base station is $G^*(\beta H_1-\alpha H_2)S_T^*$. In the fourth time slot, the signal received at the base station is $G^*(\beta H_1+\alpha H_2)S_T^*$. $S_T$ denotes the training signal representation in the frequency domain. Ignoring the additive noise present in the received signals, α and β can be obtained as the parameters $G(n)$, $H_1(n)$ and $H_2(n)$ are already known.

Training Scheme 2

A second training scheme, Training Scheme 2, will now be described with reference to FIG. 3(a).

In 502, the User 1 transmits a training signal (denoted $S_T$) during a first time slot and User 2 transmits the training signal $S_T$ during a second time slot. In 502, User 1 transmits two training signals (i.e. $[S_T\ S_T]$) consecutively during a first time slot. The transmission of two training signals consecutively may confer the advantage of a higher reliability. User 2 then also transmits two training signals during a second time slot.

In 504, User 2 receives the training signal transmitted by User 1 during the first time slot. The parameter $G_1(n)$ characterizing the inter-device channel from User 1 to User 2 is thus estimated. User 1 may optionally also receive the training signal transmitted by User 2 during the second time slot and estimate the channel parameter $G_2(n)$ characterizing the inter-device channel from User 2 to User 1.

An assumption is made that the channel 112a,112b between the users 102,104 is reciprocal. Thus it can be assumed that $G(n)=G_1(n)=G_2(n)$.

In 506, the base station 130 during the first time slot receives the training signals transmitted by User 1, and during the second time slot receives the training signals transmitted by User 2. The base station uses the training signals to estimate the channel parameters $H_1(n)$ and $H_2(n)$.

It is envisaged that the estimation of $H_1(n)$ and $H_2(n)$ may make use of training signals different from that for the estimation of $G(n)$. In such a case, User 1 and User 2 in 502 each transmits one or more additional training signals in time slots apart from the first and the second time slots. The base station 130 in 506 then receives the additional training signals and the estimation of $H_1(n)$ and $H_2(n)$ may be made using the additional training signals.

The estimation of the channel parameters $G_1(n)$, $G_2(n)$ and/or $G(n)$ in 504, as well as estimation of the channel parameters $H_1(n)$ and/or $H_2(n)$ in 506, may be performed by a suitable channel estimation technique that is known in the art.

In 508, the Users 1 and/or User 2 transmit data packets having the channel parameter $G(n)$ to the base station 130. In order to increase the reliability of the $G(n)$ recovered at the base station, space-time coding may be used, for example where User 1 transmits data packets in the sequence of [G G*] while User 2 transmits data packets in the sequence of [G −G*]. G denotes a data packet containing the channel parameter $G(n)$ while G* denotes a complex conjugate of G.

In 510, User 1 and User 2 reverse and perform complex conjugates on the signals received during the second time slot. Power amplification factors of β and −α are then applied at User 1 and User 2 respectively, thus resulting in $T_1=\beta G^*S_T^*$ and $T_2=-\alpha G^*S_T^*$. User 1 and User 2 respectively but simultaneously then perform retransmission in the form of $[T_1\ T_1]$ and $[T_2\ -T_2]$. The transmissions take place over a third and a fourth consecutive time slots.

The training signals are received at the base station. In the third time slot, the signal received at the base station is $(\beta G^*H_1-\alpha G^*H_2)S_T^*$. In the fourth time slot, the signal received at the base station is $(\beta G^*H_1+\alpha G^*H_2)S_T^*$. Ignoring the additive noise present in the received signals, α and β can be obtained as the parameters $G(n)$, $H_1(n)$ and $H_2(n)$ are already known.

Training Scheme 3

Figure 3B:
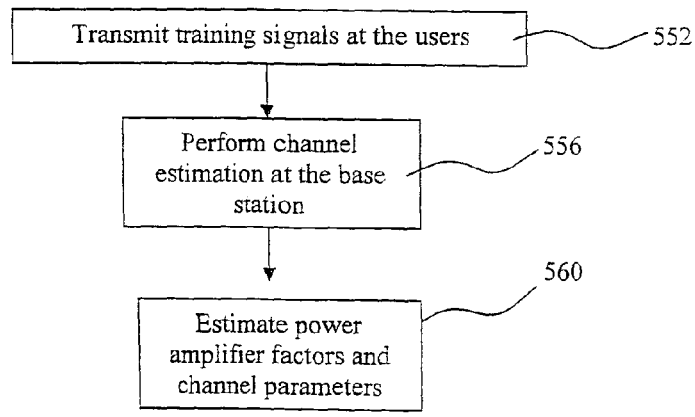

A third training scheme, Training Scheme 3, will now be described with reference to FIG. 3(b).

In 552, User 1 transmits a training signal during a first time slot. User 2 then transmits a training signal during a second time slot.

In 556, the base station 130 receives the training signal transmitted by User 1, as well as the training signal transmitted by User 2. The base station 130 uses the training signals to estimate the channel parameters $H_1(n)$ and $H_2(n)$. This may be carried out using one of the channel estimation techniques that is known in the art.

In 560, User 1 and User 2 respectively but simultaneously retransmit the training signals in the form of $[T_1\ T_1]$ and $[T_2\ -T_2]$. The transmissions take place over a third and a fourth consecutive time slots.

The training signals are received at the base station. An assumption can be made that the channel between the users is reciprocal. Thus it can be assumed that $G(n)=G_1(n)=G_2(n)$. In the third time slot, the signal received at the base station is $G^*(\beta H_1-\alpha H_2)S_T^*$. In the fourth time slot, the signal received at the base station is $G^*(\beta H_1+\alpha H_2)S_T^*$. $S_T$ denotes the training signal representation in the frequency domain. Ignoring the additive noise present in the received signals, the coefficients $\alpha G(n)$ and $\beta G(n)$ can be obtained as the parameters $H_1(n)$ and $H_2(n)$ are already known.

In the event that the channel between the users is not reciprocal, in the third time slot, the signal received at the base station is $\hat{G}_2^*H_1S_T^*-\hat{G}_1^*H_2S_T^*$. In the fourth time slot, the signal received at the base station is $\hat{G}_2^*H_1S_T^*+\hat{G}_1H_2S_T^*$. $\hat{G}_1$ and $\hat{G}_2$ respectively denote $$\hat{G}_1(n)=\alpha G_1(n),\ \hat{G}_2(n)=\beta G_2(n)$$

such that $$\hat{G}_1(n)=[\hat{G}_1(0),\hat{G}_1(1),\ldots,\hat{G}_1(N-1)]^T$$

$$\hat{G}_2(n)=[\hat{G}_2(0),\hat{G}_2(1),\ldots,\hat{G}_2(N-1)]^T$$

With the channel estimates acquired, the user 1 and user 2 is than able to cooperate to communicate with the base station 130.

Cooperative Communication (430)

During cooperative transmission, data is transmitted from User 1 and/or user 2 to the base station. Cooperative transmission can take place either in a Half-duplex Mode or a Full-duplex Mode.

In the case where OFDM is the modulation technique used, at a time k, the frequency domain OFDM blocks of length N to be transmitted from User 1 and User 2 to the base station respectively are:

$$S_{k,1}(n)=(S_{k,1}(0), S_{k,1}(1), \ldots, S_{k,1}(N-1))^T$$

$$S_{k,2}(n)=(S_{k,2}(0), S_{k,2}(1), \ldots, S_{k,2}(N-1))^T$$

After performing inverse discrete Fourier transform (IDFT), the time domain signals for User 1 and User 2 respectively are:

$$u_{k,1}(n)=(u_{k,1}(0), u_{k,1}(1), \ldots, u_{k,1}(N-1))^T$$

$$u_{k,2}(n)=(u_{k,2}(0), u_{k,2}(1), \ldots, u_{k,2}(N-1))^T$$

In the case where SCCP or SCZP is used, no IDFT operation needs to be done. The blocks to be transmitted from User 1 and User 2 to the base station are in the time domain, i.e.:

$$u_{k,1}(n)=(u_{k,1}(0), u_{k,1}(1), \ldots, u_{k,1}(N-1))^T$$

$$u_{k,2}(n)=(u_{k,2}(0), u_{k,2}(1), \ldots, u_{k,2}(N-1))^T$$

When transmitting signals between the users, the channel effect is considered. In a case where the channel between User 1 and User 2 are not reciprocal, the channel from User 1 to User 2 is denoted by $g_1(l)$ and the channel from User 2 to User 1 is denoted by $g_2(l)$. In such a case, the cyclic convolution of $g_1(l)$ and $u_{k,1}(n)$ can be denoted as $\hat{u}_{k,1}(n)$ and the cyclic convolution of $g_2(l)$ and $u_{k,2}(n)$ can be denoted as $\hat{u}_{k,2}(n)$.

$$\hat{u}_{k,1}(n)=g_1 \bullet u_{k,1}(n)+w_1(n)$$

$$\hat{u}_{k,2}(n)=g_2 \bullet u_{k,2}(n)+w_2(n)$$

The notation • denotes a cyclic convolution of length N.

An assumption is made that the channels between User 1 and User 2 are reciprocal. In such a case, the channel between User 1 and User 2 is denoted $g(l), l=0, 1 \ldots, L$. The cyclic prefix or zero padding that is used between User 1 and User 2 is selected to be longer than L. The cyclic convolution of $g(l)$ and $u_{k,1}(n)$ can be denoted as $\hat{u}_{k,1}(n)$ and the cyclic convolution of $g(l)$ and $u_{k,2}(n)$ can be denoted as $\hat{u}_{k,2}(n)$.

$$\hat{u}_{k,1}(n)=g(n) \bullet u_{k,1}(n)+w_1(n)$$

$$\hat{u}_{k,2}(n)=g(n) \bullet u_{k,2}(n)+w_2(n)$$

$w_1(n)$ and $w_2(n)$ are additive noise.

A reversal operation is next performed to the signals received at User 1 and/or User 2. The reversal operation performed on $\hat{u}_{k,1}(n)$ and $\hat{u}_{k,2}(n)$ respectively produces:

$$\hat{u}_{k,1}(-n)=\hat{u}_{k,1}(N-n), n=1, \ldots, N-1$$

$$\hat{u}_{k,2}(-n)=\hat{u}_{k,2}(N-n), n=1, \ldots, N-1$$

Half-Duplex Mode

In the Half-duplex Mode, a user does not transmit and receive at the same time. Transmissions and reception are made separately at different times. In such a mode, User 1 and User 2 use three time slots to cooperatively transmit two OFDM blocks, thus enhancing the transmission reliability.

Figure 4A:
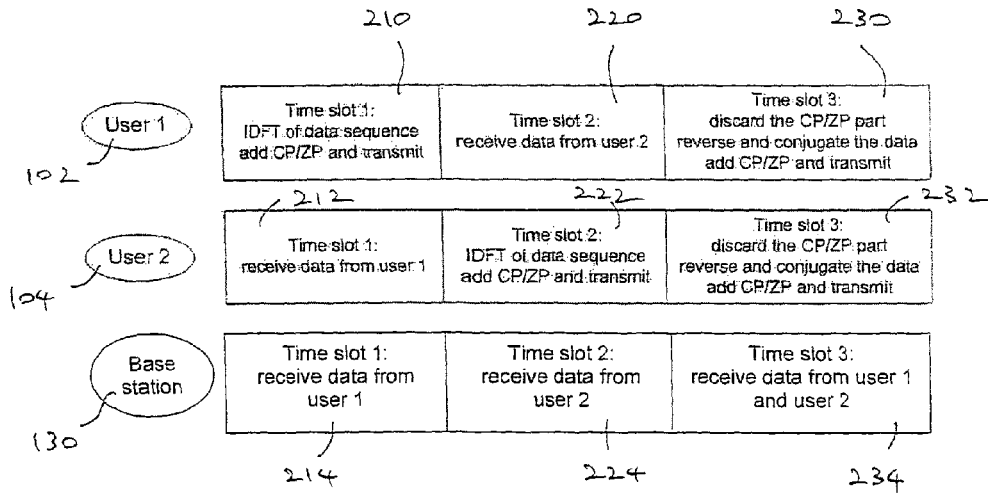
FIG. 4($a$) are time block diagrams illustrating communication in different time slots based on half duplex OFDM between two users and the base station of FIG. 1.

FIG. 4(a) shows the communication steps for an embodiment where the half-duplex mode is used along with OFDM modulation. It should be understood that the reference numerals in FIG. 4(a) or the rest of the figures do not imply any form of sequence and the steps may take place concurrently or in any order.

In time slot 1, User 1 at step 210 performs an OFT on $S_{k,1}(n)$ to get $u_{k,1}(n)$. A cyclic prefix or zero padding is appended to $u_{k,1}(n)$. $u_{k,1}(n)$ with the cyclic prefix or zero padding is then transmitted from User 1. In step 212, which is also time slot 1 for User 2, User 2 receives $u_{k,1}(n)$ in the form of the signal $\hat{u}_{k,1}(n)$. At step 214, which is time slot 1 for the base station, the base station 130 receives $u_{k,1}(n)$ in the form of a signal $x_{k,1}(n)$ In time slot 2, User 2 at step 222 performs an IDFT on $S_{k,2}(n)$ to get $u_{k,2}(n)$. A cyclic prefix or zero padding is appended to $u_{k,2}(n)$. $u_{k,2}(n)$ with the cyclic prefix or zero padding is then transmitted from User 2. At step 220, User 1 receives $u_{k,2}(n)$ from User 2 in the form of the signal $\hat{u}_{k,2}(n)$. At step 224, the base station also receives $u_{k,2}(n)$ from User 2 in the form of a signal $x_{k,2}(n)$.

In time slot 3, an amplify and forward (AF) scheme is used and User 1 at step 230 discards the cyclic prefix or zero padding from $\hat{u}_{k,2}(n)$. $\hat{u}_{k,2}(n)$ is then reversed and complex conjugated to produce $\hat{u}_{k,2}*(-n)$. The power amplifier factor β obtained from the channel estimation is applied. A cyclic prefix or zero padding is appended to $\beta\hat{u}_{k,2}*(-n)$. The cyclic prefix or zero padding has a length that is greater the length of the channel parameter $h_1(l)$ where $l=0, 1, \ldots L_1$. $\beta\hat{u}_{k,2}(-n)$ with the cyclic prefix or zero padding is then transmitted from User 1.

User 2 at step 232 also discards the cyclic prefix or zero padding from $\hat{u}_{k,1}(n)$. $\hat{u}_{k,1}(n)$ is then reversed and complex conjugated to produce $\hat{u}_{k,1}(-n)$. $\hat{u}_{k,1}(-n)$ is negated to yield $-\hat{u}_{k,1}(-n)$ and the power amplifier factor α estimated earlier is applied. A cyclic prefix or zero padding is appended to $-\alpha\hat{u}_{k,1}*(-n)$. The cyclic prefix or zero padding has a length that is greater the length of the channel parameter $h_2(l)$ where $l=0, 1, \ldots L_2$. $-\alpha\hat{u}_{k,1}(-n)$ with the cyclic prefix or zero padding is then transmitted from User 2.

At step 234, the base station 130 receives a signal $x_{k,3}(n)$ comprising $-\alpha\hat{u}_{k,1}*(-n)$ and $\beta\hat{u}_{k,2}*(-n)$.

The above described the process when the AF scheme is used but in the event that a decode and forward (DF) scheme is used i.e. where User 1 and User 2 decode their received signal before transmission, step 230 includes an additional sub-step after discarding the cyclic prefix or zero padding from $\hat{u}_{k,2}(n)$ where $\hat{u}_{k,2}(n)$ is decoded to produce $u_{k,2}(n)$. This results in the transmission of $\beta u_{k,2}*(-n)$ from User 1. Step 232 also includes an additional sub-step after discarding the cyclic prefix or zero padding from $\hat{u}_{k,1}(n)$ where $\hat{u}_{k,1}(n)$ is decoded to produce $u_{k,1}(n)$ and this results in the transmission of $-\alpha u_{k,1}*(-n)$ from User 2. In this case, the base station 130 is configured to receive the signal $x_{k,3}(n)$ comprising $-\alpha u_{k,1}*(-n)$ and $\beta u_{k,2}*(-n)$ at step 234.

Figure 4B:
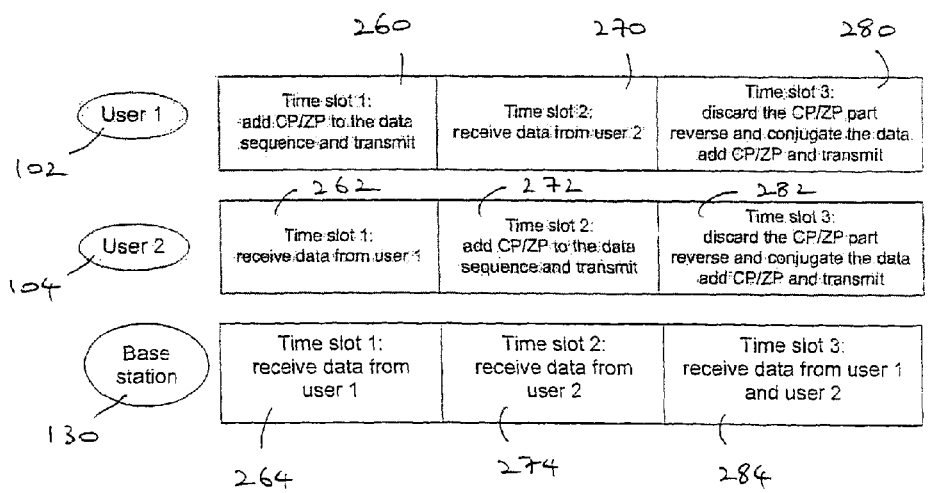

FIG. 4(b) shows the communication steps for an alternative embodiment where the half-duplex mode is used along with SCCP or SCZP modulation. The steps involved are similar to that for the embodiment that uses OFDM modulation, except that IDFT does not need to be done.

In time slot 1, User 1 in step 260 appends a cyclic prefix or zero padding to $u_{k,1}(n)$. $u_{k,1}(n)$ with the cyclic prefix or zero padding is then transmitted from User 1. At step 262, User 2 receives $u_{k,1}(n)$ in the form of the signal $\hat{u}_{k,1}(n)$. In step 264, the base station 130 receives $u_{k,1}(n)$ in the form of a signal $x_{k,1}(n)$.

In time slot 2, User 2 in step 272 appends a cyclic prefix or zero padding to $u_{k,2}(n)$. $u_{k,2}(n)$ with the cyclic prefix or zero padding is then transmitted from User 2. In step 270, User 1 receives $u_{k,2}(n)$ in the form of the signal $\hat{u}_{k,2}(n)$. In step 274, the base station also receives $u_{k,2}(n)$ in the form of a signal $x_{k,2}(n)$.

In time slot 3, an amplify and forward (AF) scheme is used, and User 1 in step 280 discards the cyclic prefix or zero padding from $\hat{u}_{k,2}(n)$. $\hat{u}_{k,2}(n)$ is then reversed and complex conjugated to produce $\hat{u}_{k,2}^*(-n)$. The power amplifier factor $\beta$ estimated earlier is applied. A cyclic prefix or zero padding is appended to $\beta\hat{u}_{k,2}^*(-n)$. The cyclic prefix or zero padding has a length that is greater the length of the channel parameter $h_1(l)$ where $l=0, 1, \ldots L_1$. $\beta\hat{u}_{k,2}^*(-n)$ with the cyclic prefix or zero padding is then transmitted from User 1.

User 2 in step 282 also discards the cyclic prefix or zero padding from $\hat{u}_{k,1}(n)$. $\hat{u}_{k,1}(n)$ is then reversed and complex conjugated to produce $\hat{u}_{k,1}^*(-n)$. $\hat{u}_{k,1}^*(-n)$ is negated to yield $-\hat{u}_{k,1}^*(-n)$ and the power amplifier factor $\alpha$ is applied. A cyclic prefix or zero padding is appended to $-\alpha\hat{u}_{k,1}^*(-n)$. The cyclic prefix or zero padding has a length that is greater the length of the channel parameter $h_2(l)$ where $l=0, 1, \ldots L_2$. $-\alpha\hat{u}_{k,1}^*(-n)$ with the cyclic prefix or zero padding is then transmitted from User 2.

In step 284, the base station 130 receives a signal $x_{k,3}(n)$ comprising $-\alpha\hat{u}_{k,1}^*(-n)$ and $\beta\hat{u}_{k,2}^*(-n)$.

In the event that a decode and forward (DF) scheme is used i.e. where User 1 and User 2 decode their received signal before transmission, step 280 includes an additional sub-step after discarding the cyclic prefix or zero padding from $\hat{u}_{k,2}(n)$ where $\hat{u}_{k,2}(n)$ is decoded to produce $u_{k,2}(n)$. This results in the transmission of $\beta u_{k,2}^*(-n)$ from User 1. Step 282 also includes an additional sub-step after discarding the cyclic prefix or zero padding from $\hat{u}_{k,1}(n)$ where $\hat{u}_{k,1}(n)$ is decoded to produce $u_{k,1}(n)$ and this results in the transmission of $-\alpha u_{k,1}^*(-n)$ from User 2, in this case, the base station is configured to receive the signal $x_{k,3}(n)$ comprising $-\alpha u_{k,1}^*(-n)$ and $\beta u_{k,2}^*(-n)$ at step 284.

Full-Duplex Mode

In the Full-duplex Mode, a user can transmit and receive at the same time. In such a mode, User 1 and User 2 use two time slots to cooperatively transmit two OFDM, SCCP or SCZP blocks, thus enhancing the transmission reliability.

Figure 5A:
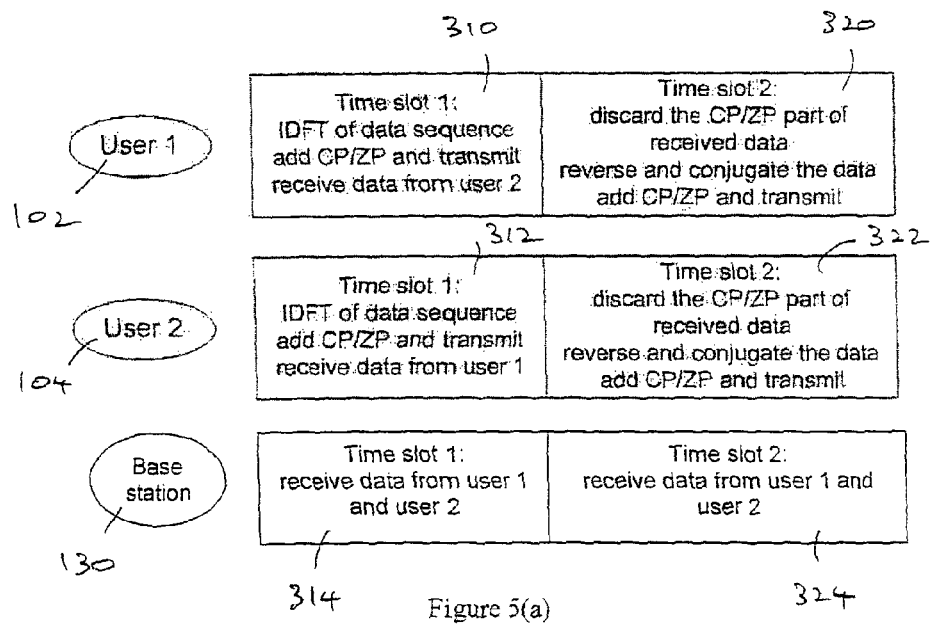
FIG. 5($a$) are time block diagrams illustrating communication in different time slots based on full duplex OFDM between two users and the base station of FIG. 1.
Figure 5B:
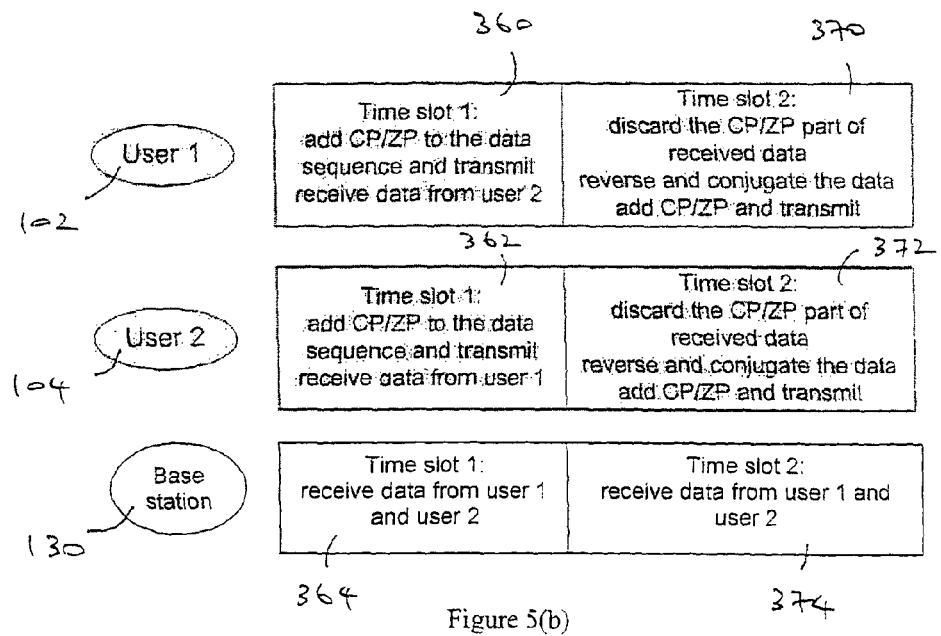

FIG. 5(*a*) shows the communication steps where full-duplex mode is used along with OFDM modulation.

in time slot 1, User 1 in step 310 performs an OFT on $S_{k,1}(n)$ to get $u_{k,1}(n)$. A cyclic prefix or zero padding is appended to $u_{k,1}(n)$. $u_{k,1}(n)$ with the cyclic prefix or zero padding is then transmitted from User 1. User 1 in the same time slot also receives the signal $u_{k,2}(n)$ in the form of the signal $\hat{u}_{k,2}(n)$. The signal $u_{k,2}(n)$ is transmitted from User 2 in step 312.

In step 312, User 2 performs an IDFT on $S_{k,2}(n)$ to get $u_{k,2}(n)$. A cyclic prefix or zero padding is appended to $u_{k,2}(n)$. $u_{k,2}(n)$ with the cyclic prefix or zero padding is then transmitted from User 2. User 2 in the same time slot also receives the $u_{k,1}(n)$ from User 1 in the form of the signal $\hat{u}_{k,1}(n)$.

At step 314, the base station receives a signal $x_{k,1}(n)$ comprising $u_{k,1}(n)$ and $u_{k,2}(n)$.

In time slot 2, in the event that an amplify and forward (AF) scheme is used, User 1 in 320 discards the cyclic prefix or zero padding from $\hat{u}_{k,2}(n)$. $\hat{u}_{k,2}(n)$ is then reversed and complex conjugated to produce $\hat{u}_{k,2}^*(-n)$. The power amplifier factor $\beta$ is applied. A cyclic prefix or zero padding is appended to $\beta\hat{u}_{k,2}^*(-n)$. The cyclic prefix or zero padding has a length that is greater the length of the channel parameter $h_1(l)$ where $l=0, 1, \ldots L_1$. $\beta\hat{u}_{k,2}^*(-n)$ with the cyclic prefix or zero padding is then transmitted from User 1.

User 2 in step 322 also discards the cyclic prefix or zero padding from $\hat{u}_{k,1}(n)$. $\hat{u}_{k,1}(n)$ is then reversed and complex conjugated to produce $\hat{u}_{k,1}^*(-n)$. $\hat{u}_{k,1}^*(-n)$ is negated to yield $-\hat{u}_{k,1}^*(-n)$ and the power amplifier factor $\alpha$ is applied. A cyclic prefix or zero padding is appended to $-\alpha\hat{u}_{k,1}^*(-n)$. The cyclic prefix or zero padding has a length that is greater the length of the channel parameter $h_2(l)$ where $l=0, 1, \ldots L_2$. $-\alpha\hat{u}_{k,1}^*(-n)$ with the cyclic prefix or zero padding is then transmitted from User 2.

in step 324, the base station receives a signal $x_{k,2}(n)$ comprising $-\alpha\hat{u}_{k,1}^*(-n)$ and $\beta\hat{u}_{k,2}^*(-n)$.

In the event that a decode and forward (DF) scheme is used i.e. where User 1 and User 2 decode their received signal before transmission, step 320 includes an additional sub-step where $\hat{u}_{k,2}(n)$ is decoded to produce $u_{k,2}(n)$. This results in the transmission of $\beta u_{k,2}^*(-n)$ from User 1. Step 322 also includes an additional sub-step where $\hat{u}_{k,1}(n)$ is decoded to produce $u_{k,1}(n)$ and this results in the transmission of $-\alpha u_{k,1}^*(-n)$ from User 2. In this case, the base station 130 in 324 would receive the signal $x_{k,2}(n)$ comprising $-\alpha u_{k,1}^*(-n)$ and $\beta u_{k,2}^*(-n)$.

FIG. 5(*b*) shows the communication steps for an embodiment where the full-duplex mode is used along with SCCP or SCZP modulation. The steps involved are similar to that for the embodiment that uses OFDM modulation, except that IDFT does not need to be done.

In time slot 1, User 1 in step 360 appends a cyclic prefix or zero padding to $u_{k,1}(n)$. $u_{k,1}(n)$ with the cyclic prefix or zero padding is then transmitted from User 1. User 1 in the same time slot also receives the signal $u_{k,2}(n)$ in the form of the signal $\hat{u}_{k,2}(n)$. The signal $u_{k,2}(n)$ is transmitted from User 2 in step 312.

In step 362, User 2 appends a cyclic prefix or zero padding to $u_{k,2}(n)$. $u_{k,2}(n)$ with the cyclic prefix or zero padding is then transmitted from User 2. User 2 in the same time slot also receives the $u_{k,1}(n)$ from User 1 in the form of the signal $\hat{u}_{k,1}(n)$.

In step 364, the base station receives a signal $x_{k,1}(n)$ comprising $u_{k,1}(n)$ and $u_{k,2}(n)$.

In time slot 2, in the event that an amplify and forward (AF) scheme is used, User 1 in step 370 discards the cyclic prefix or zero padding from $\hat{u}_{k,2}(n)$. $\hat{u}_{k,2}(n)$ is then reversed and complex conjugated to produce $\hat{u}_{k,2}^*(-n)$. The power amplifier factor $\beta$ is applied. A cyclic prefix or zero padding is appended to $\beta\hat{u}_{k,2}^*(-n)$. The cyclic prefix or zero padding has a length that is greater the length of the channel parameter $h_1(l)$ where $l=0, 1, \ldots L_1$. $\beta\hat{u}_{k,2}^*(-n)$ with the cyclic prefix or zero padding is then transmitted from User 1.

User 2 in step 372 also discards the cyclic prefix or zero padding from $\hat{u}_{k,1}(n)$. $\hat{u}_{k,1}(n)$ is then reversed and complex conjugated to produce $\hat{u}_{k,1}^*(-n)$. $\hat{u}_{k,1}^*(-n)$ is negated to yield $-\hat{u}_{k,1}^*(-n)$ and the power amplifier factor $\alpha$ is applied. A cyclic prefix or zero padding is appended to $-\alpha\hat{u}_{k,1}^*(-n)$. The cyclic prefix or zero padding has a length that is greater than the length of the channel parameter $h_2(l)$ where $i=0, 1, \ldots L_2$. $-\alpha\hat{u}_{k,1}^*(-n)$ with the cyclic prefix or zero padding is then transmitted from User 2.

In step 374, the base station 130 receives a signal $x_{k,2}(n)$ comprising $-\alpha\hat{u}_{k,1}^*(-n)$ and $\beta\hat{u}_{k,2}^*(-n)$.

In the event that a decode and forward (DF) scheme is used i.e. where User 1 and User 2 decode their received signal before transmission, step 370 includes an additional sub-step where $\hat{u}_{k,2}(n)$ is decoded to produce $u_{k,2}(n)$. This results in the transmission of $\beta u_{k,2}^*(-n)$ from User 1. Step 372 also includes an additional sub-step where $\hat{u}_{k,1}(n)$ is decoded to produce $u_{k,1}(n)$ and this results in the transmission of $-\alpha u_{k,1}^*(-n)$ from User 2. In this case, the base station 130 is configured to receive the signal $x_{k,2}(n)$ comprising $-\alpha u_{k,1}^*(-n)$ and $\beta u_{k,2}^*(-n)$ at step 374.

Signal Combination (440)

Next, signal detection at the base station 130 is described and this will be based on four signal combination schemes (Combining Schemes 1 to 4). The combination schemes permit the received signals at the base station to have full diversity gains. The detection may be in a base station using a processor that is configured to perform the signal combination steps.

In all embodiments, the combining schemes are not limited by the modulation technique used. The modulation schemes used may for example be OFDM, SCCP or SCZP. All embodiments also assume that the parameters $G_1(n)$ and $G_2(n)$ (in the case where the channel between users is non-reciprocal) or $G(n)$ (in the case where the channel between users is reciprocal) of the channel between the users are known, as are the parameters $H_1(n)$ and $H_2(n)$ respectively of the channels between User 1 or User 2, and the base station. The embodiments also assume that the power amplifier factors $\alpha$ and $\beta$ are known. The power amplifier factors $\alpha$ and $\beta$, the parameters $G_1(n)$ and $G_2(n)$ (or $G(n)$), as well as parameters $H_1(n)$ and $H_2(n)$ optionally can be estimated during the channel estimation step 420.

The embodiments are also described with the assumption of an amplify and forward (AF) scheme but as the skilled reader will understand, the combining schemes are also equally applicable for decode and forward (DF) schemes since DF schemes can be treated as special cases of the AF scheme.

Combining Scheme 1

Figure 6:
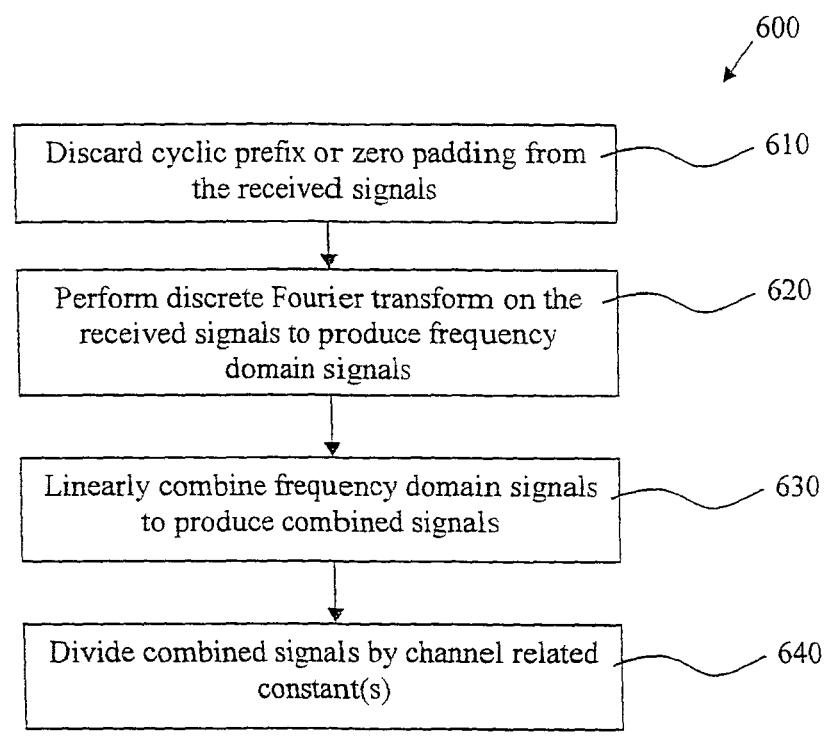
FIG. 6 is a flow chart depicting a general signal combining scheme at the base station of FIG. 1.

Combining Scheme 1 will now be described with reference to FIG. 6. This scheme is based on Half-duplex Mode during cooperative transmission. The base station 130 is configured to receive three signals $x_{k,1}(n)$, $x_{k,2}(n)$ and $x_{k,3}(n)$ during the cooperative transmission time slots 1, 2 and 3. The three signals are in time domain and respectively are:

$$x_{k,1}(n) = h_1(n) \cdot u_{k,1}(n) + \eta_1(n)$$

$$x_{k,2}(n) = h_2(n) \cdot u_{k,2}(n) + \eta_2(n)$$

$$x_{k,3}(n) = h_1(n) \cdot \beta \hat{u}_{k,2}(-n) - h_2(n) \cdot \alpha \hat{u}_{k,1}^*(-n) + \eta_3(n)$$

$\eta_1(n)$, $\eta_2(n)$ and $\eta_3(n)$ are additive noise introduced by the respective channels over which the base station receives signals in time slots 1, 2 and 3.

In step 610, the cyclic prefix or zero padding are discarded from the signals $x_{k,1}(n)$, $x_{k,2}(n)$ and $x_{k,3}(n)$.

At step 620, a discrete Fourier transform (DFT) is performed on the time domain signals $x_{k,1}(n)$, $x_{k,2}(n)$ and $x_{k,3}(n)$ resulting in the frequency domain signals $X_{k,1}(n)$, $X_{k,2}(n)$ and $X_{k,3}(n)$:

$$X_{k,1}(n) = H_1(n) S_{k,1}(n) + \Gamma_1(n)$$

$$X_{k,2}(n) = H_2(n) S_{k,2}(n) + \Gamma_2(n)$$

$$X_{k,3}(n) = H_1(n) \beta \hat{U}_{k,2}^*(n) - H_2(n) \alpha \hat{U}_{k,1}^*(n) + \Gamma_3(n)$$

$\Gamma_1(n)$, $\Gamma_2(n)$ and $\Gamma_3(n)$ respectively are frequency domain equivalents of $\eta_1(n)$, $\eta_2(n)$ and $\eta_3(n)$. $\hat{U}_{k,1}(n)$ and $\hat{U}_{k,2}(n)$ respectively are the DFTs of $\hat{u}_{k,1}(n)$ and $\hat{u}_{k,2}(n)$.

Assuming that the channels between User 1 and User 2 are reciprocal, $\hat{U}_{k,1}(n)$ and $\hat{U}_{k,2}(n)$ can be expressed as $$\hat{U}_{k,1}(n) = G(n) S_{k,1}(n) + W_1(n)$$

$$\hat{U}_{k,2}(n) = G(n) S_{k,2}(n) + W_2(n)$$

$X_{k,3}(n)$ can thus be expressed as $$X_{k,3}(n) = \beta H_1(n) G^*(n) S_{k,2}^*(n) - \alpha H_2(n) G^*(n) S_{k,1}^*(n) + \Lambda_3(n)$$

where $$\Lambda_3(n) = \beta H_1(n) W_2^*(n) - \alpha H_2(n) W_1^*(n) + \Gamma_3(n)$$

and $X_{k,3}^*(n)$ is $$X_{k,3}^*(n) = \beta H_1^*(n) G(n) S_{k,2}(n) - \alpha H_2^*(n) G(n) S_{k,1}(n) + \Lambda_3^*(n)$$

At step 630, linear combinations are applied to the frequency domain signals.

For the signals $X_{k,1}(n)$ and $X_{k,2}(n)$, they are combined to produce $Y_k(n)$:

$$Y_k(n) = \beta G(n) X_{k,1}(n) + \alpha G(n) X_{k,2}(n)$$
$$= \beta H_1(n) G(n) S_{k,1}(n) + \alpha H_2(n) G(n) S_{k,2}(n) + \Lambda(n)$$

where $$\Lambda(n) = \beta G(n) \Gamma_1(n) + \alpha G(n) \Gamma_2(n)$$

$Y_k(n)$ can be combined with $X_{k,3}^*(n)$ to produce $Z_{k,1}(n)$ and $Z_{k,2}(n)$:

$$Z_{k,1}(n) = \beta H_1^*(n) G^*(n) Y_k(n) - \alpha H_2(n) G^*(n) X_{k,3}^*(n)$$

$$Z_{k,2}(n) = \alpha H_2^*(n) G^*(n) Y_k(n) + \beta H_1(n) G^*(n) X_{k,3}^*(n)$$

At step 640, the combined signals at step 630 are divided by a channel related constant $\rho(n)$, thus obtaining the original signals $S_{k,1}(n)$ and $S_{k,2}(n)$.

Arranging $Y_k(n)$ and $X_{k,3}^*(n)$ into a matrix, it can be shown that $$\begin{bmatrix} Y_k(n) \\ X_{k,3}^*(n) \end{bmatrix} = \begin{pmatrix} \beta H_1(n) G(n) & \alpha H_2(n) G(n) \\ -\alpha H_2^*(n) G(n) & \beta H_1^*(n) G(n) \end{pmatrix} \begin{bmatrix} S_{k,1}(n) \\ S_{k,2}(n) \end{bmatrix} + \begin{bmatrix} \Lambda(n) \\ \Lambda_3^*(n) \end{bmatrix}$$

Based on the orthogonal property of the matrix, we have $$S_{k,1}(n) = Z_{k,1}(n)/\rho(n) + Y_1(n)$$

$$S_{k,2}(n) = Z_{k,2}(n)/\rho(n) + Y_2(n)$$

where $$\rho(n) = |\beta H_1(n) G(n)|^2 + |\alpha H_2(n) G(n)|^2 = |G(n)|^2 (|\beta H_1(n)|^2 + |\alpha H_2(n)|^2)$$

$$Y_1(n) = -[\beta H_1^*(n) G^*(n) \Lambda(n) - \alpha H_2(n) G^*(n) \Lambda_3^*(n)]/\rho(n)$$

$$Y_2(n) = -[\alpha H_2^*(n) G^*(n) \Lambda(n) + \beta H_1(n) G^*(n) \Lambda_3^*(n)]/\rho(n)$$

The signals $S_{k,1}(n)$ and $S_{k,2}(n)$ originating from User 1 and User 2 respectively can thus be obtained by dividing $Z_{k,1}(n)$ and $Z_{k,2}(n)$ by $\rho(n)$ which is obtained from the channel estimation described earlier.

Combining Scheme 2

An alternative combining scheme, Combining Scheme 2, will now be described with reference also to FIG. 6. This scheme assumes that Half-duplex Mode is used during cooperative transmission. The base station 130 is configured to receive three signals $x_{k,1}(n)$, $x_{k,2}(n)$ and $x_{k,3}(n)$ during the cooperative transmission time slots 1, 2 and 3. The three signals are in time domain and respectively are:

$$x_{k,1}(n) = h_1(n) \cdot u_{k,1}(n) + \eta_1(n)$$

$$x_{k,2}(n) = h_2(n) \cdot u_{k,2}(n) + \eta_2(n)$$

$$x_{k,3}(n) = h_1(n) \cdot \beta \hat{u}_{k,2}(-n) - h_2(n) \cdot \alpha \hat{u}_{k,1}^*(-n) + \eta_3(n)$$

$\eta_1(n)$, $\eta_2(n)$ and $\eta_3(n)$ are additive noise introduced by the respective channels over which the base station receives signals in time slots 1, 2 and 3.

In step 610, the cyclic prefix or zero padding are discarded from the signals $x_{k,1}(n)$, $x_{k,2}(n)$ and $x_{k,3}(n)$.

In step 620, a discrete Fourier transform (DFT) is performed on the time domain signals $x_{k,1}(n)$, $x_{k,2}(n)$ and $x_{k,3}(n)$, resulting in the frequency domain signals $X_{k,1}(n)$, $X_{k,2}(n)$ and $X_{k,3}(n)$:

$$X_{k,1}(n) = H_1(n)S_{k,1}(n) + \Gamma_1(n)$$

$$X_{k,2}(n) = H_2(n)S_{k,2}(n) + \Gamma_2(n)$$

$$X_{k,3}(n) = H_1(n)\beta \hat{U}_{k,2}^*(n) - H_2(n)\alpha \hat{U}_{k,1}^*(n) + \Gamma_3(n)$$

$\Gamma_1(n)$, $\Gamma_2(n)$ and $\Gamma_3(n)$ respectively are frequency domain equivalents of $\eta_1(n)$, $\eta_2(n)$ and $\eta_3(n)$. $\hat{U}_{k,1}(n)$ and $\hat{U}_{k,2}(n)$ respectively are the DFTs of $\hat{u}_{k,1}(n)$ and $\hat{u}_{k,2}(n)$.

Assuming that the channels between User 1 and User 2 are reciprocal, $\hat{U}_{k,1}(n)$ and $\hat{U}_{k,2}(n)$ can be expressed as:

$$\hat{U}_{k,1}(n) = G(n)S_{k,1}(n) + W_1(n)$$

$$\hat{U}_{k,2}(n) = G(n)S_{k,2}(n) + W_2(n)$$

$X_{k,3}(n)$ can thus be expressed as $$X_{k,3}(n) = \beta H_1(n)G^*(n)S_{k,2}^*(n) - \alpha H_2(n)G^*(n)S_{k,1}^*(n) + \Lambda_3(n)$$

where $$\Lambda_3(n) = \beta H_1(n)W_2^*(n) - \alpha H_2(n)W_1^*(n) + \Gamma_3(n)$$

In step 630, linear combinations are applied to the frequency domain signals.

The signals $X_{k,1}(n)$, $X_{k,2}(n)$ and $X_{k,3}(n)$ are combined to produce $W_{k,1}(n)$ and $W_{k,2}(n)$:

$$\begin{aligned}W_{k,1}(n) &= H_1^*(n)X_{k,1}(n) + \alpha\beta H_1^*(n)|G(n)|^2 X_{k,2}(n) - \\ &\quad \alpha H_2(n)G^*(n)X_{k,3}^*(n) \\ &= |H_1(n)|^2 S_{k,1}(n) + \alpha\beta H_1^*(n)|G(n)|^2 H_2(n)S_{k,2}(n) - \\ &\quad \alpha H_2(n)G^*(n)\beta H_1^*(n)G(n)S_{k,2}(n) + \\ &\quad \alpha H_2(n)G^*(n)\alpha H_2^*(n)G(n)S_{k,1}(n) + \hat{Y}_1(n) \\ &= (|H_1(n)|^2 + \alpha^2|H_2(n)|^2|G(n)|^2)S_{k,1}(n) + \hat{Y}_1(n)\end{aligned}$$

$$\begin{aligned}W_{k,2}(n) &= H_2^*(n)X_{k,2}(n) + \alpha\beta H_2^*(n)|G(n)|^2 X_{k,1}(n) + \\ &\quad \beta H_1(n)G^*(n)X_{k,3}^*(n) \\ &= |H_2(n)|^2 S_{k,2}(n) + \alpha\beta H_2^*(n)|G(n)|^2 H_1(n)S_{k,1}(n) + \\ &\quad \beta H_1(n)G^*(n)\beta H_1^*(n)G(n)S_{k,2}(n) - \\ &\quad \beta H_1(n)G^*(n)\alpha H_2^*(n)G(n)S_{k,1}(n) + \hat{Y}_2(n) \\ &= (|H_2(n)|^2 + \beta^2|H_1(n)|^2|G(n)|^2)S_{k,2}(n) + \hat{Y}_2(n)\end{aligned}$$

where $$\hat{Y}_1(n) = H_1^*(n)\Gamma_1(n) + \alpha\beta H_1^*(n)|G(n)|^2\Gamma_2(n) - \alpha H_2(n)G^*(n)\Lambda_3^*(n)$$

$$\hat{Y}_2(n) = H_2^*(n)\Gamma_2(n) + \alpha\beta H_2^*(n)|G(n)|^2\Gamma_1(n) + \beta H_1(n)G^*(n)\Lambda_3^*(n)$$

In step 640, the combined signals at step 630 are divided by channel related constants $\rho_1(n)$ and $\rho_2(n)$, thus obtaining the original signals $S_{k,1}(n)$ and $S_{k,2}(n)$:

$$S_{k,1}(n) = W_{k,1}(n)/\rho_1(n)$$

$$S_{k,2}(n) = W_{k,2}(n)/\rho_2(n)$$

where $$\rho_1(n) = (|H_1(n)|^2 + \alpha^2|H_2(n)|^2|G(n)|^2)$$

$$\rho_2(n) = (|H_2(n)|^2 + \beta^2|H_1(n)|^2|G(n)|^2)$$

The signals $S_{k,1}(n)$ and $S_{k,2}(n)$ originating from User 1 and User 2 respectively can thus be obtained by dividing $W_{k,1}(n)$ and $W_{k,2}(n)$ by $\rho_1(n)$ and $\rho_2(n)$.

This combination scheme has a diversity of order 2 and the data rate is two-thirds that of a structure where no cooperation is used.

Combining Scheme 3

A third combining scheme, Combining Scheme 3, will now be described with reference to FIG. 6 again. This scheme assumes that Full-duplex Mode is used during cooperative transmission. The base station 130 is configured to receive two signals $x_{k,1}(n)$ and $x_{k,2}(n)$ during the cooperative transmission time slots 1 and 2. The two signals are in time domain and respectively are:

$$x_{k,1}(n) = h_1(n) \bullet u_{k,1}(n) + h_2(n) \bullet u_{k,2}(n) + \eta_1(n)$$

$$x_{k,2}(n) = h_1(n) \bullet \beta \hat{u}_{k,2}^*(-n) - h_2(n) \bullet \alpha \hat{u}_{k,1}^*(-n) + \eta_2(n)$$

$\eta_1(n)$ and $\eta_2(n)$ are additive noise introduced by the respective channels over which the base station receives signals in time slots 1 and 2.

In step 610, the cyclic prefix or zero padding are discarded from the signals $x_{k,1}(n)$ and $x_{k,2}(n)$.

In step 620, a discrete Fourier transform (DFT) is performed on the time domain signals $x_{k,1}(n)$ and $x_{k,2}(n)$, resulting in the frequency domain signals $X_{k,1}(n)$ and $X_{k,2}(n)$:

$$X_{k,1}(n) = H_1(n)S_{k,1}(n) + H_2(n)S_{k,2}(n) + \Gamma_1(n)$$

$$X_{k,2}(n) = H_1(n)\beta \hat{U}_{k,2}^*(n) - H_2(n)\alpha \hat{U}_{k,1}^*(n) + \Gamma_2(n)$$

$\Gamma_1(n)$ and $\Gamma_2(n)$ respectively are frequency domain equivalents of $\eta_1(n)$ and $\eta_2(n)$. $\hat{U}_{k,1}(n)$ and $\hat{U}_{k,2}(n)$ respectively are the DFTs of $\hat{u}_{k,1}(n)$ and $\hat{u}_{k,2}(n)$.

Assuming that the channels between User 1 and User 2 are reciprocal, $\hat{U}_{k,1}(n)$ and $\hat{U}_{k,2}(n)$ can be expressed as:

$$\hat{U}_{k,1}(n) = G(n)S_{k,1}(n) + W_1(n)$$

$$\hat{U}_{k,2}(n) = G(n)S_{k,2}(n) + W_2(n)$$

$X_{k,2}(n)$ can thus be expressed as $$X_{k,2}(n) = \beta H_1(n)G^*(n)S_{k,2}^*(n) - \alpha H_2(n)G^*(n)S_{k,1}^*(n) + \Lambda_2(n)$$

where $$\Lambda_2(n) = \beta H_1(n)W_2^*(n) - \alpha H_2(n)W_1^*(n) + \Gamma_2(n)$$

and $X_{k,2}^*(n)$ is $$X_{k,2}^*(n) = \beta H_1^*(n)G(n)S_{k,2}(n) - \alpha H_2^*(n)G(n)S_{k,1}(n) + \Lambda_2^*(n)$$

In step 630, linear combinations are applied to the frequency domain signals. Assuming that the power amplifier factors $\alpha = \beta$, $Y_k(n)$ can be obtained from $X_{k,1}(n)$ as $$Y_k(n) = \alpha G(n)X_{k,1}(n) = \alpha H_1(n)G(n)S_{k,1}(n) + \alpha H_2(n)G(n)S_{k,2}(n) + \Lambda(n)$$

where $$\Lambda(n) = \alpha G(n)\Gamma_1(n)$$

$Y_k(n)$ can then be combined with $X_{k,2}^*(n)$ to produce $Z_{k,1}(n)$ and $Z_{k,2}(n)$:

$$Z_{k,1}(n) = \alpha H_1^*(n)G^*(n)Y_k(n) - \alpha H_2(n)G^*(n)X_{k,2}^*(n)$$

$$Z_{k,2}(n) = \alpha H_2^*(n)G^*(n)Y_k(n) + \alpha H_1(n)G^*(n)X_{k,2}^*(n)$$

In step 640, the combined signals of 630 are divided by a channel related constant ρ(n), thus obtaining the original signals $S_{k,1}(n)$ and $S_{k,2}(n)$.

Arranging $Y_k(n)$ and $X_{k,2}^*(n)$ into a matrix, it can be shown that $$\begin{bmatrix} Y_k(n) \\ X_{k,2}^*(n) \end{bmatrix} = \begin{pmatrix} \alpha G(n)H_1(n) & \alpha G(n)H_2(n) \\ -\alpha H_2^*(n)G(n) & \alpha H_1^*(n)G(n) \end{pmatrix} \begin{bmatrix} S_{k,1}(n) \\ S_{k,2}(n) \end{bmatrix} + \begin{bmatrix} \Lambda(n) \\ \Lambda_2^*(n) \end{bmatrix}$$

Based on the orthogonal property of the matrix, we have $$S_{k,1}(n) = Z_{k,1}(n)/\rho(n) + Y_1(n)$$

$$S_{k,2}(n) = Z_{k,2}(n)/\rho(n) + Y_2(n)$$

where $$\rho(n) = |\alpha H_1(n)G(n)|^2 + |\alpha H_2(n)G(n)|^2 = \alpha^2|G(n)|^2(|H_1(n)|^2 + |H_2(n)|^2)$$

$$Y_1(n) = -[\alpha H_1^*(n)G^*(n)\Lambda(n) - \alpha H_2(n)G^*(n)\Lambda_2^*(n)]/\rho(n)$$

$$Y_2(n) = -[\alpha H_2^*(n)G^*(n)\Lambda(n) + \alpha H_1(n)G^*(n)\Lambda_2^*(n)]/\rho(n)$$

The signals $S_{k,1}(n)$ and $S_{k,2}(n)$ originating from User 1 and User 2 respectively can thus be obtained by dividing $Z_{k,1}(n)$ and $Z_{k,2}(n)$ by ρ(n).

Combining Scheme 4

A fourth combining scheme, Combining Scheme 4, will now be described with reference to FIG. 6 again. The parameters are that the channels between User 1 and User 2 are not reciprocal and the channel from User 1 to User 2 is denoted $g_1(l)$, while the channel from User 2 to User 1 is denoted $g_2(l)$. This scheme assumes that half-duplex Mode is used during cooperative transmission. The base station would have received three signals $x_{k,1}(n)$, $x_{k,2}(n)$ and $x_{k,3}(n)$ during the cooperative transmission time slots 1, 2 and 3. The three signals are in time domain and respectively are:

$$x_{k,1}(n) = h_1(n) \bullet u_{k,1}(n) + \eta_1(n)$$

$$x_{k,2}(n) = h_2(n) \bullet u_{k,2}(n) + \eta_2(n)$$

$$x_{k,3}(n) = h_1(n) \bullet g_2^*(-n) \bullet \beta u_{k,2}^*(-n) - h_2(n) \bullet g_1^*(-n) \bullet \alpha u_{k,1}^*(-n) + \eta_3(n)$$

$\eta_1(n)$, $\eta_2(n)$ and $\eta_3(n)$ are additive noise introduced by the respective channels over which the base station 130 receives signals in time slots 1, 2 and 3.

In step 610, the cyclic prefix or zero padding are discarded from the signals $x_{k,1}(n)$, $x_{k,2}(n)$ and $x_{k,3}(n)$.

In step 620, a discrete Fourier transform (DFT) is performed on the time domain signals $x_{k,1}(n)$, $x_{k,2}(n)$ and $x_{k,3}(n)$, resulting in the frequency domain signals $X_{k,1}(n)$, $X_{k,2}(n)$ and $X_{k,3}(n)$:

$$X_{k,1}(n) = H_1(n)S_{k,1}(n) + \Gamma_1(n)$$

$$X_{k,2}(n) = H_2(n)S_{k,2}(n) + \Gamma_2(n)$$

$$X_{k,3}(n) = \beta H_1(n)G_2^*(n)S_{k,2}^*(n) - \alpha H_2(n)G_1^*(n)S_{k,1}^*(n) + \Lambda_3(n)$$

$\Gamma_1(n)$, $\Gamma_2(n)$ and $\Lambda_3(n)$ respectively are frequency domain equivalents of $\eta_1(n)$, $\eta_2(n)$ and $\eta_3(n)$.

$X_{k,3}^*(n)$ can be expressed as $$X_{k,3}^*(n) = \hat{G}_2(n)H_1^*(n)S_{k,2}(n) - \hat{G}_1(n)H_2^*(n)S_{k,1}(n) + \Lambda_3^*(n)$$

where $$\hat{G}_1(n) = \alpha G_1(n), \hat{G}_2(n) = \beta G_2(n)$$

$G_1(n)$ and $G_2(n)$ respectively are the DFTs of $g_1(l)$ and $g_2(l)$.

In step 630, linear combinations are applied to the frequency domain signals.

The signals $X_{k,1}(n)$, $X_{k,2}(n)$ and $X_{k,3}^*(n)$ are combined to produce $\hat{W}_{k,1}(n)$ and $\hat{W}_{k,2}(n)$:

$$\hat{W}_{k,1}(n) = H_1^*(n)X_{k,1}(n) + \hat{G}_2(n)\hat{G}_1^*(n)H_1^*(n)X_{k,2}(n) - \hat{G}_1^*(n)H_2(n)X_{k,3}^*(n)$$

$$= |H_1(n)|^2 S_{k,1}(n) + \hat{G}_2(n)\hat{G}_1^*(n)H_1^*(n)H_2(n)S_{k,2}(n) - \hat{G}_1^*(n)H_2(n)\hat{G}_2(n)H_1^*(n)S_{k,2}(n) + \hat{G}_1^*(n)H_2(n)\hat{G}_1(n)H_2^*(n)S_{k,1}(n) + \hat{Y}_1(n)$$

$$= \left(|H_1(n)|^2 + \left|\hat{G}_1(n)\right|^2 |H_2(n)|^2\right) S_{k,1}(n) + \hat{Y}_1(n)$$

$$\hat{W}_{k,2}(n) = H_2^*(n)X_{k,2}(n) + \hat{G}_1(n)\hat{G}_2^*(n)H_2^*(n)X_{k,1}(n) + \hat{G}_2^*(n)H_1(n)X_{k,3}^*(n)$$

$$= |H_2(n)|^2 S_{k,2}(n) + \hat{G}_1(n)\hat{G}_2^*(n)H_2^*(n)H_1(n)S_{k,1}(n) + \hat{G}_2^*(n)H_1(n)\hat{G}_2(n)H_1^*(n)S_{k,2}(n) - \hat{G}_2^*(n)H_1(n)\hat{G}_1(n)H_2^*(n)S_{k,1}(n) + \hat{Y}_2(n)$$

$$= \left(|H_2(n)|^2 + \left|\hat{G}_2(n)\right|^2 |H_1(n)|^2\right) S_{k,2}(n) + \hat{Y}_2(n)$$

where $$\hat{Y}_1(n) = H_1^*(n)\Gamma_1(n) + \hat{G}_2(n)\hat{G}_1^*(n)H_1^*(n)\Gamma_2(n) - \hat{G}_1^*(n)H_2(n)\Lambda_3^*(n)$$

$$\hat{Y}_2(n) = H_2^*(n)\Gamma_2(n) + \hat{G}_1(n)\hat{G}_2^*(n)H_2^*(n)\Gamma_1(n) + \hat{G}_2^*(n)H_1(n)\Lambda_3^*(n)$$

At step 640, the combined signals at step 630 are divided by channel related constants $\hat{\rho}_1(n)$ and $\hat{\rho}_1(n)$, thus obtaining the original signals $S_{k,1}(n)$ and $S_{k,2}(n)$:

$$S_{k,1}(n) = \hat{W}_{k,1}(n)/\hat{\rho}_1(n)$$

$$S_{k,2}(n) = \hat{W}_{k,2}(n)/\hat{\rho}_2(n)$$

where $$\hat{\rho}_1(n) = (|H_1(n)|^2 + |\hat{G}_1(n)|^2 |H_2(n)|^2)$$

$$\hat{\rho}_2(n) = (|H_2(n)|^2 + |\hat{G}_2(n)|^2 |H_1(n)|^2)$$

The signals $S_{k,1}(n)$ and $S_{k,2}(n)$ originating from User 1 and User 2 respectively can thus be obtained by dividing $\hat{W}_{k,1}(n)$ and $\hat{W}_{k,2}(n)$ by $\hat{\rho}_1(n)$ and $\hat{\rho}_1(n)$.

This combination scheme has a diversity of order 2 and the data rate is two-thirds that of a structure where no cooperation is used.

Simulations

Simulation results are next provided to show the advantages of the described embodiment. While the results shown are for OFDM modulation, the skilled reader will understand that results for SCCP or SCZP would be the similar. An OFDM block size of N=256 is used, along with coded prefixes of length 64.

The simulations further use the Half-duplex Mode. It is understood that a comparable Full-duplex Mode simulation will yield a performance that is similar to that for the Combining Scheme 1 at Half-duplex Mode.

It is assumed that the channel between User 1 and User 2 is frequency selective with 4 taps i.e. L=3. The channel taps have exponential decay profile: E(|g(l)|)=exp(−2l),l=0, 1, 2, 3. While the simulation assumes that the channels between User 1 and User 2 are reciprocal, the skilled addressee will understand that results for the case where the channels are non-reciprocal will be the same.

It is also assumed that the channel from User 1 or User 2 to the base station is frequency selective with 62 taps each i.e. $L_1=L_2=61$. Equally expected power is assumed for the channel taps.

Let the signal-to-noise ratio (SNR) for User 1 receiving signals from User 2 in the time slot 2 be $\gamma$. Correspondingly, $\gamma$ is also the SNR for User 2 receiving signals from User 1 in the time slot 1. It is assumed that the received signals SNRs at the base station for the both users are the same. It is also assumed that perfect channel information is available at the base station for both the cooperative scheme and non-cooperative scheme, and that the system is synchronized. For the non-cooperative scheme, zero-forcing detection is used.

Complex Gaussian random numbers are generated for the channel taps and the channels are different for every different Monte-Carlo realization. The symbol error rate (SER) is obtained from 50000 different Monte-Carlo realizations.

The power amplifier factors $\alpha$ and $\beta$ are chosen such that the transmitted signal power is the same at different time slots.

The FIGS. 7(a) to 7(h) show for different $\gamma$ values, the average SER of the signals recovered at the base station for Combining Scheme 1, Combining Scheme 2 and where no cooperation is used.

Figure 7A:
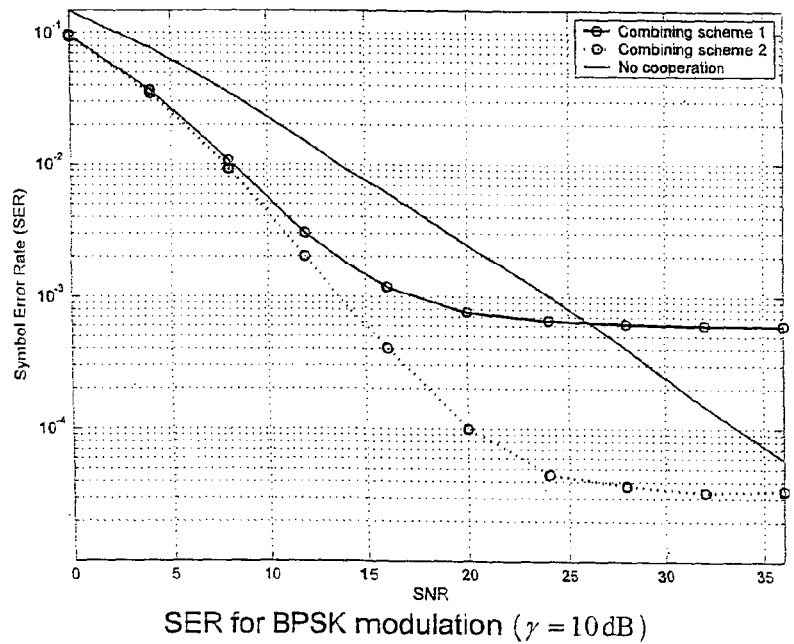
FIG. 7($a$) is a graph of an average Symbol Error Rate (SER) of a signal recovered at the base station based on the signal combining scheme of FIG. 6 when BPSK modulation is used and $\gamma$ is 10 dB.
FIG. 7(h) is a graph of an average SER of a signal recovered at the base station based on the signal combining scheme of FIG. 6 when 4 QAM modulation is used, γ is 20 dB and channel estimation NMSE is −40 dB.
Figure 7B:
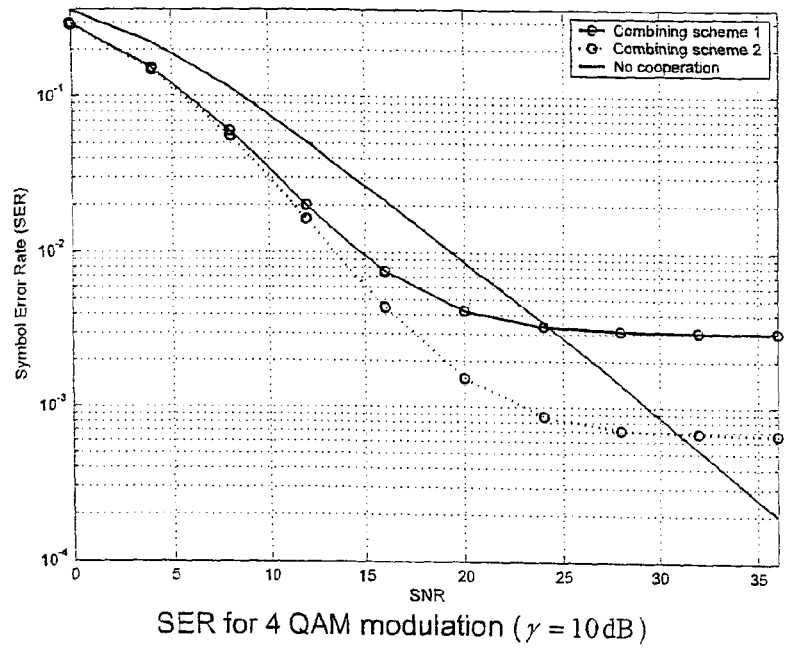

FIGS. 7(a) and 7(b) respectively show the average SER when $\gamma=10$ dB and BPSK and 4 QAM modulations are used. When the channel between the two users is not good (i.e. $\gamma=10$ dB), the cooperative schemes (i.e. Combining Scheme 1 and 2) obtain a much lower SER for SNR lower than 25 dB, but higher SER for SNR higher than 25 dB.

Figure 7C:
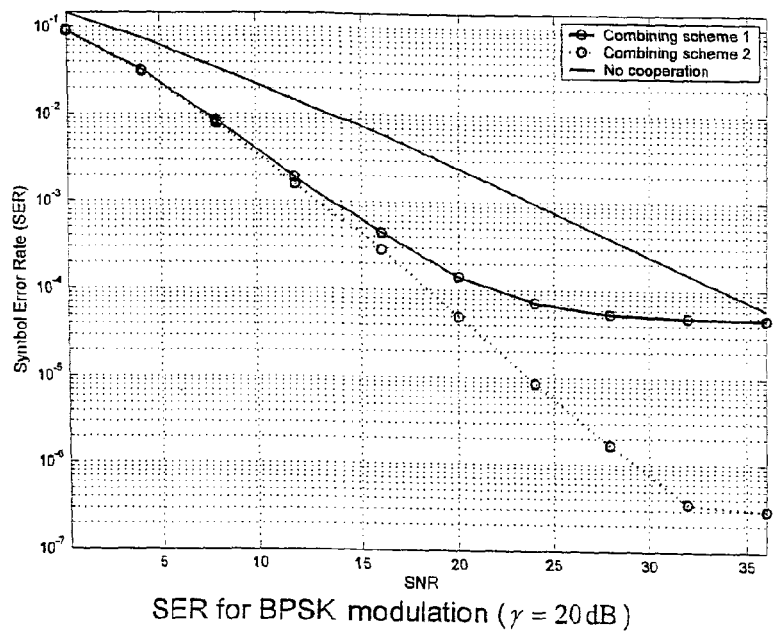
Figure 7D:
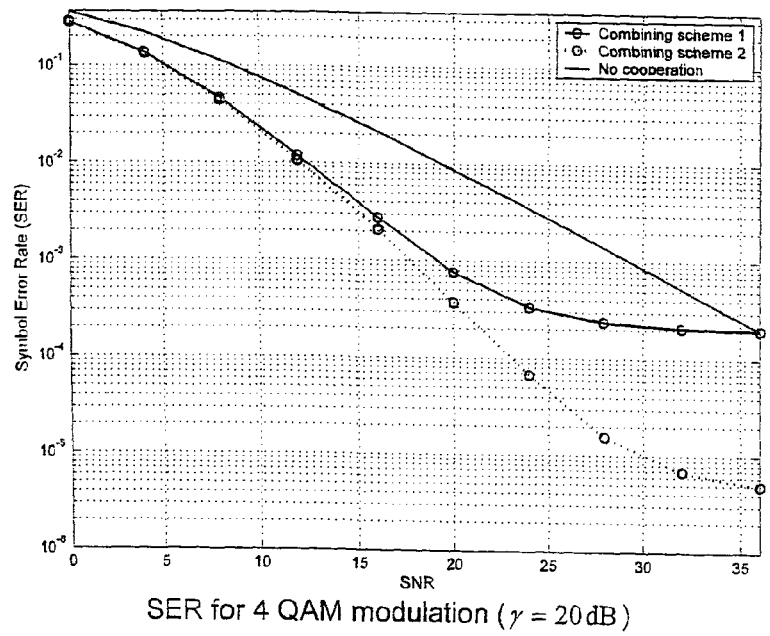
Figure 7E:
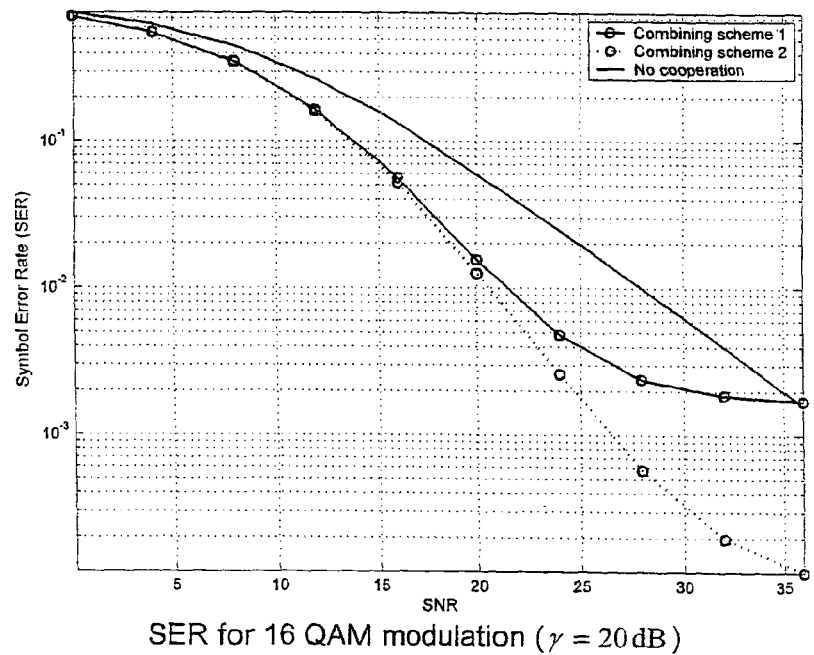

FIGS. 7(c), 7(d) and 7(e) respectively show the average SER when $\gamma=20$ dB and BPSK, 4 QAM and 16 QAM modulations are used. When the channel between the two users becomes better (i.e. $\gamma=20$ dB), the cooperative schemes obtain better performance while the non-cooperative scheme remains the same. It can be seen that at $\gamma=20$ dB the cooperative schemes obtain better SER performance than the non-cooperative scheme for all SNR values below 36 dB. This better SER performance is especially true when Combining Scheme 2 is used.

Figure 7F:
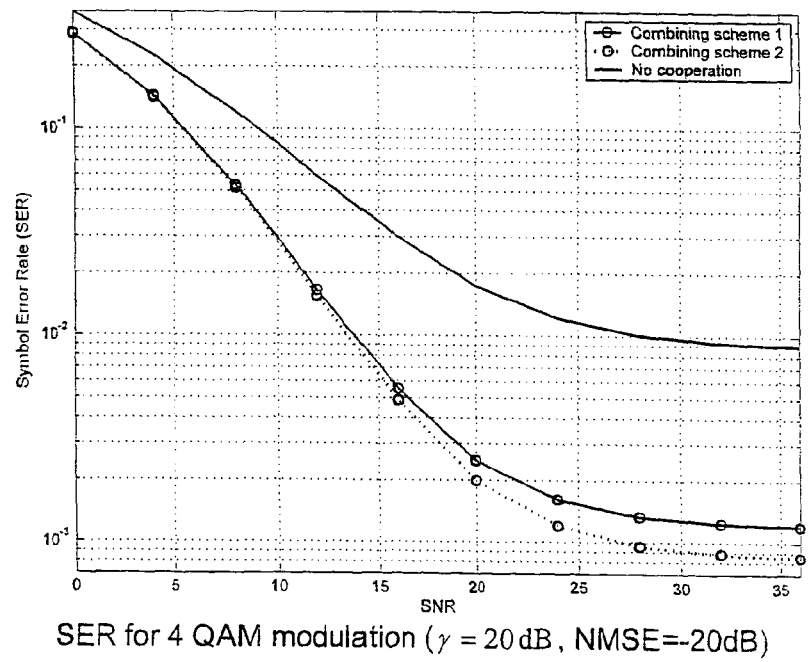
Figure 7G:
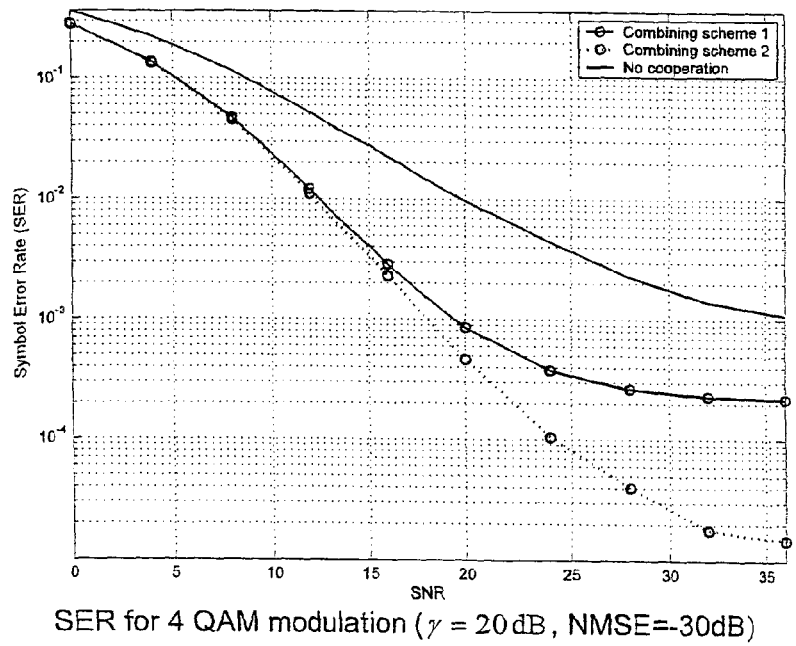
Figure 7H:
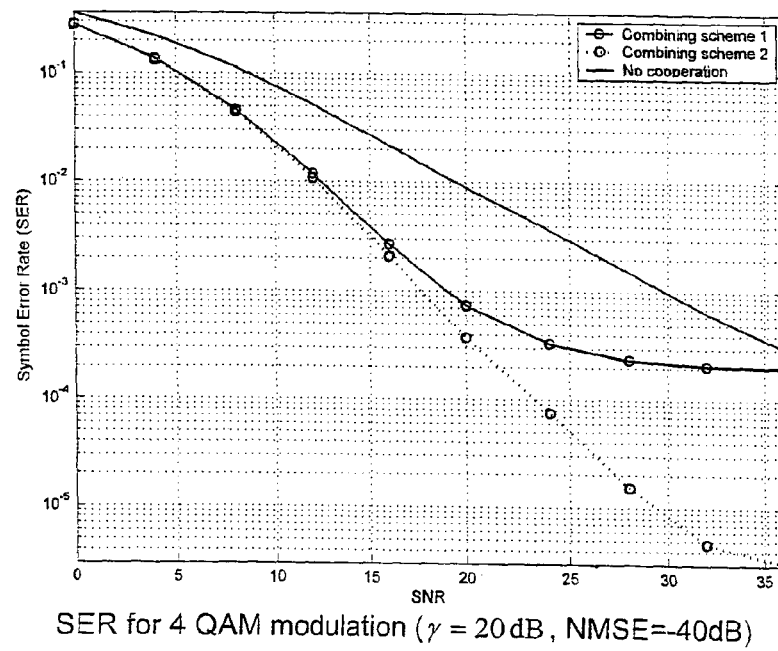

FIGS. 7(f), 7(g) and 7(h) respectively show the average SER when channel estimation for the channels between the users, and the channels between the users and the base station is not perfect, and the normalized mean square errors (NMSE) of channel estimation respectively are −40 dB, −30 dB and −20 dB. The NMSE is defined as $$NMSE = \frac{E(\|f - \hat{f}\|^2)}{E(\|f\|^2)}$$

where f and $\hat{f}$ are the actual and estimated channel, respectively.

When there are errors in channel estimation, both the cooperative and non-cooperative schemes yield SER values that are worse. However, it can be seen that for all NMSE values, the cooperative schemes nevertheless still yield SER results that are consistently better than that for the non-cooperative scheme.

It should be appreciated that proposed combining and training schemes may be used for different applications. For example, they can be used for uplink in traditional centralized cellular networks. It is envisaged that multiple users are divided into different groups with each group having N number of users. For users in different groups, conventional techniques can be used to allow multiple access. For example, it is possible to use frequency division multiple access (FDMA), that is, users in different groups using different frequencies; or time division multiple access (TDMA) may be used, that is, users in different groups using different time slots; or orthogonal frequency division multiple access (OFDMA) is used with users in different groups using different OFDM subcarriers. Within the same group, it is preferred that the users use the same frequency or frequency band, that is, TDMA is used within the same group. The proposed schemes may be for cooperation within a group to increase signal reliability at the destination.

The described embodiments should not be construed as limitative. For example, the described embodiment of FIG. 1 uses TDMA. Alternative methods of supporting multiple access may also be used within the group, e.g.: code division multiple access (CDMA), frequency division multiple access (FDMA) or orthogonal frequency division multiple access (OFDMA). The users may have one antenna each, or they may optionally have multiple antennae.

Embodiments of the present invention may have multiple base stations and/or multiple groups of users where the number of users in each group may be different. In the case where there are multiple groups of users, conventional techniques may be used to allow multiple access, for example FDMA may be used where users in different groups use different frequencies. Alternatively, TDMA may be used where the users in different groups use different time slots. Further embodiments may alternatively use OFDMA where users in different groups use different orthogonal frequency-division multiplexing (OFDM) subcarriers. The usage of multiple access techniques permits the elimination of multi-user interference (MUI).

It should also be apparent that the described embodiments also apply to SCCP and SCZP. Also, the present invention may be extended to P>2 and the users in such a case do not have to cooperate pairwise, but rather can cooperate in a daisy chain fashion.

While example embodiments of the invention have been described in detail, many variations are possible within the scope of the invention as will be clear to a skilled reader.

The invention claimed is:

1. A space-time coded cooperative communication method for a wireless communication network, the network including a first communication device and a second communication device, each of the communication devices being associated with respective users and configured to communicate with a common destination, the method comprising the steps of:
the first communication device:
transmitting a first message to the second communication device for transmission to the common destination as a first routed message and to the common destination in a same time slot;
receiving a second message from the second communication device for transmission to the common destination as a second routed message; and
amplifying the second message;
the common destination:
receiving the first message directly from the first communication device;
receiving the second message directly from the second communication device;
decoding the received first and second messages and the first and second routed messages;

converting the received first and second messages from time to frequency domain;
obtaining a first combination sequence by linearly combining the frequency domain first and second messages;
obtaining a second combination sequence by linearly combining the first combination sequence and the first and second routed messages;
dividing the first combination sequence or the second combination sequence by a channel related sequence which characterizes a first transmission path between the first communication device and the common destination, and a second transmission path between the second communication device and the destination; and
prior to decoding the received first and second messages, estimating a first channel parameter which characterizes the first transmission path based on a main training signal transmitted by the first communication device; and
prior to transmitting the first message, the first communication device:
transmitting an auxiliary training signal to the second communication device,
an inter-device channel parameter which characterizes an inter-device transmission path between the first and the second communication device based on the training signal; and transmitting the inter-device channel parameter to the common destination;
wherein the channel related sequence is obtained by combining the first channel parameter and a second channel parameter which characterizes the second transmission path.

2. A space-time coded cooperative wireless communication method according to claim 1, wherein transmission of the first message to the second communication device and receiving the second message from the second communication device are carried out in the same time slot.

3. A space-time coded cooperative wireless communication method according to claim 1, wherein transmission of the first message to the second communication device and receiving the second message from the second communication device are carried out in different time slots.

4. A space-time coded cooperative wireless communication method according to claim 1, further comprising the steps of:
discarding a first padding from the received second message;
performing a complex conjugate on the received second message;
re-ordering of the received second message; and
inserting a second padding into the received second message, to form the second routed message for transmission to the common destination.

5. A space-time coded cooperative wireless communication method according to claim 4, wherein the discarding, performing a complex conjugate, re-ordering and inserting steps are performed in a time slot different from the time slot for transmitting the first message.

6. A space-time coded cooperative wireless communication method according to claim 4, wherein the first padding and/or the second padding includes a cyclic prefix.

7. A space-time coded cooperative wireless communication method according to claim 4, further comprising the step of decoding the second message after discarding the first padding from the second message.

8. A space-time coded cooperative wireless communication method according to claim 1, further comprising the step of: negating the second message.

9. A space-time coded cooperative wireless communication method according claim 1, further comprising the step of converting the second message from frequency domain to time domain.

10. A space-time coded cooperative wireless communication method according to claim 1, wherein the second routed message is transmitted using OFDM modulation.

11. A space-time coded cooperative wireless communication method according to claim 1, wherein the second routed message is transmitted using Single Carrier—Cyclic Prefix modulation.

12. A space-time coded cooperative wireless communication method according to claim 1, further comprising the step of; the second communication device, receiving the first message for transmission to the destination.

13. A space-time coded cooperative wireless communication method according to claim 12, further comprising the steps of:
the second communication device,
discarding a first padding from the received first message;
performing a complex conjugate on the received first message;
re-ordering of the received first message; and
inserting a second padding into the received first message, to form the first routed message for transmission to the common destination.

14. A space-time coded cooperative wireless communication method according to claim 13, wherein the discarding, performing a complex conjugate, re-ordering and inserting steps are performed in a time slot different from the time slot for receiving the first message.

15. A space-time coded cooperative wireless communication method according to claim 1, wherein the decoding further comprises the steps of:
converting the first and second routed messages from time to frequency domain; and wherein the first combination sequence includes linearly combining the frequency domains of the first and second messages, and the first and second routed messages.

16. A space-time coded cooperative wireless communication method according to claim 1, wherein the decoding comprises the steps of:
converting the received first message and the first and second routed message from time to frequency domain; and
obtaining a first combination sequence by linearly combining the frequency domain first message and the first and second routed messages.

17. A space-time coded cooperative wireless communication method according to claim 1, further comprising the steps of, prior to the decoding step, the common destination, discards a first padding from the received first message;
discards a second padding from the first routed message.

18. A space-time coded cooperative wireless communication method according to claim 1, further comprising the step of:
the first communication device transmitting the second routed message to a third communication device of the network, and the third communication device relaying the second routed message to the destination.

19. A space-time coded cooperative wireless communication method according to claim 1, further comprising the step of: the second communication device transmitting the first routed message to a fourth communication device of the network, and the fourth communication device relaying the first routed message to the destination.

20. A space-time coded cooperative wireless communication method according to claim 1, wherein the main training signal is the auxiliary training signal.

21. A space-time coded cooperative wireless communication method according to claim 1, wherein the auxiliary training signal comprises a first training signal and a repetition of the first training signal.

22. A space-time coded cooperative wireless communication method according to claim 1, the second communication device retransmitting the auxiliary signal to the common destination which estimates an amplification factor based on the auxiliary signal for decoding the amplified second message.

23. A space-time coded cooperative wireless communication method according to claim 1, wherein transmitting the inter-device channel parameter comprises transmitting a complex conjugate of the inter-device channel parameter.

24. A space-time coded cooperative wireless communication method according to claim 23, wherein the transmitting the inter-device channel parameter further comprises transmitting a negation of the complex conjugate of the inter-device channel parameter.

25. A space-time coded cooperative wireless communication method according to claim 1, wherein the second routed message comprises:
in a first signal interval, a first training signal; and
in a second signal interval, a second training signal, the second training signal being a negation of the first training signal.

26. A space-time coded cooperative communication method for a wireless communication network, the network including a first communication device and a second communication device, each of the communication devices being associated with respective users and configured to communicate with a common destination, the first communication device being configured to transmit a first message to the second communication device and to the common destination in a first time slot, the second communication device being configured to transmit the first message as a first routed message, the method comprising the steps of:
the common destination:
receiving the first message from the first communication device in the first time slot and the first routed message from the second communication device in a second or third time slot;
receiving a second message from the second communication device in the first or second time slot and a second routed message from the first communication device in the second or third time slot, the second routed message including the second message transmitted by the second communication device;
converting the received first and second messages from time to frequency domain; and
obtaining a first combination sequence by linearly combining the frequency domain first and second messages;
obtaining a second combination sequence by linearly combining the first combination sequence and the first and second routed messages;
dividing the first combination sequence or the second combination sequence by a channel related sequence which characterizes a first transmission path between the first communication device and the common destination, and a second transmission path between the second communication device and the destination;
prior to decoding the received first and second messages, the common destination estimating a first channel parameter which characterizes the first transmission path based on a main training signal transmitted by the first communication device; and
prior to transmitting the first message, the first communication device:
transmitting an auxiliary training signal to the second communication device,
obtaining an inter-device channel parameter which characterizes an inter-device transmission path between the first and the second communication device based on the training signal; and
transmitting the inter-device channel parameter to the common destination;
wherein the channel related sequence is obtained by combining the first channel parameter and a second channel parameter which characterizes the second transmission path.

27. A space-time coded cooperative communication method according to claim 1, wherein the wireless communication network is a cellular network.

28. A space-time coded cooperative communication method according to claim 1, wherein the communication devices are mobile communication devices.

29. A wireless communication network comprising a communication device configured for space-time coded cooperative communication with a second communication device, the communication device and the second communication device being associated with respective users and configured to communicate with a common destination in the wireless communication network, the communication device further configured to:
transmit a first message to the second communication device for transmission to the common destination and to the common destination in a same time slot;
receive a second message from the second communication device for transmission to the common destination;
convert the received second message from time to frequency domain;
obtain a first combination sequence by linearly combining the frequency domain first and second messages; and
prior to transmitting the first message, transmitting an auxiliary training signal to the second communication device, and obtaining an inter-device channel parameter which characterizes an inter-device transmission path between the first and the second communication device based on the training signal; and
transmitting the inter-device channel parameter to the common destination;
the common destination further configured to:
receive the first message directly from the first communication device;
receive the second message directly from the second communication device;
decode the received first and second messages and the first and second routed messages;
convert the received first and second messages from time to frequency domain;
obtain a first combination sequence by linearly combining the frequency domain first and second messages;
obtain a second combination sequence by linearly combining the first combination sequence and the first and second routed messages;
divide the first combination sequence or the second combination sequence by a channel related sequence which characterizes a first transmission path between the first communication device and the common destination, and a second transmission path between the second communication device and the common destination;

prior to decoding the received first and second messages, estimating the first channel parameter based on a main training signal transmitted by the first communication device;

wherein the channel related sequence is obtained by combining a first channel parameter which characterizes the first transmission path and a second channel parameter which characterizes the second transmission path.

30. A wireless communication network according to claim 29, wherein the communication device is configured to transmit the first message to the second communication device and receive the second message from the second communication device in the same time slot.

31. A wireless communication network according to claim 29, wherein the communication device is configured to transmit the first message to the second communication device and receive the second message from the second communication device in different time slots.

32. A wireless communication network comprising a communication device which is configured for space-time coded cooperative communication with a second communication device in the wireless communication network, the communication device and the second communication device being associated with respective users and configured to communicate with a common destination of the wireless communication network, the communication device comprising an integrated circuit (IC) the IC further comprising:

a processing unit configured to transmit a first message to the second communication device for transmission to the common destination and to the common destination in a same time slot; to receive a second message from the second communication device for transmission to the common destination; to convert the received second message from time to frequency domain; to obtain a first combination sequence by linearly combining the frequency domain first and second messages; prior to transmitting the first message, to transmit an auxiliary training signal to the second communication device; to obtain an inter-device channel parameter which characterizes an inter-device transmission path between the first and the second communication device based on the training signal; and to transmit the inter-device channel parameter to the common destination;

the common destination configured to receive the first message directly from the first communication device; to receive the second message directly from the second communication device; to decode the received first and second messages and the first and second routed messages; to convert the received first and second messages from time to frequency domain; to obtain a first combination sequence by linearly combining the frequency domain first and second messages; to obtain a second combination sequence by linearly combining the first combination sequence and the first and second routed messages; to divide the first combination sequence or the second combination sequence by a channel related sequence which characterizes a first transmission path between the first communication device and the common destination, and a second transmission path between the second communication device and the destination; and to estimate a first channel parameter which characterizes the first transmission path based on a main training signal transmitted by the first communication device prior to decoding the received first and second messages;

wherein the channel related sequence is obtained by combining the first channel parameter and a second channel parameter which characterizes the second transmission path.

33. An Integrated circuit (IC) for a base station of a wireless communication network including first and second communication devices configured for space-time coded cooperative communication, each communication device being associated with respective users and configured to communicate with the base station, the first communication device being configured to transmit a first message to the second communication device and to the base station in a first time slot, the second communication device being configured to transmit the first message as a first routed message, the IC including a processor configured to:

receive the first message from the first communication device in the first time slot and the first routed message from the second communication device in a second or third time slot, and receive a second message from the second communication device in the first or second time slot and a second routed message from the first communication device in the second or third time slot, the second routed message including the second message transmitted by the second communication device;

decode the received first and second messages and the first and second routed messages convert the received first and second messages from time to frequency domain;

obtain a second combination sequence by linearly combining the first combination sequence and the first and second routed messages;

divide the first combination sequence or the second combination sequence by a channel related sequence which characterizes a first transmission path between the first communication device and the base station, and a second transmission path between the second communication device and the base station; and estimate the first channel parameter based on a main training signal transmitted by the first communication device prior to decoding the received first and second messages;

wherein the channel related sequence is obtained by combining the first channel parameter and a second channel parameter which characterizes the second transmission path.

34. A base station including an IC according to claim 33.

35. A wireless communication network of claim 29 comprising more than one communication devices and one or more common destinations.

* * * * *